United States Patent
Tsujimura et al.

(10) Patent No.: US 10,573,110 B2
(45) Date of Patent: Feb. 25, 2020

(54) LOCKING AND UNLOCKING CONTROL SYSTEM AND LOCKING AND UNLOCKING CONTROL METHOD

(71) Applicant: TOYOTA JIDOSHA KABUSHIKI KAISHA, Toyota-shi (JP)

(72) Inventors: Hiroko Tsujimura, Nagoya (JP); Kei Kanaoka, Nagoya (JP); Shun Maeda, Nisshin (JP); Yoshihiro Murozaki, Nisshin (JP); Daiki Kaneichi, Nisshin (JP); Kuniaki Jinnai, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/194,714

(22) Filed: Nov. 19, 2018

(65) Prior Publication Data

US 2019/0180545 A1 Jun. 13, 2019

(30) Foreign Application Priority Data

Dec. 8, 2017 (JP) .................................. 2017-235832

(51) Int. Cl.
*G07C 9/00* (2006.01)
*G06Q 10/08* (2012.01)
*A47G 29/14* (2006.01)

(52) U.S. Cl.
CPC ....... *G07C 9/00896* (2013.01); *A47G 29/141* (2013.01); *G06Q 10/0832* (2013.01); *G07C 9/00309* (2013.01); *G07C 9/00571* (2013.01); *G07C 2009/00277* (2013.01); *G07C 2009/00293* (2013.01)

(58) Field of Classification Search
None
See application file for complete search history.

(56) References Cited

U.S. PATENT DOCUMENTS

| 6,928,415 | B1 * | 8/2005 | Liberman | A47G 29/141 |
|---|---|---|---|---|
| | | | | 383/120 |
| 9,536,359 | B1 * | 1/2017 | Gokcebay | E05B 47/06 |
| 9,922,513 | B1 * | 3/2018 | Hall | G08B 13/196 |
| 2003/0025590 | A1 * | 2/2003 | Gokcebay | G06Q 40/04 |
| | | | | 340/5.73 |
| 2013/0073477 | A1 * | 3/2013 | Grinberg | A47G 29/141 |
| | | | | 705/332 |

(Continued)

FOREIGN PATENT DOCUMENTS

JP 2006-206225 8/2006

*Primary Examiner* — Chico A Foxx
(74) *Attorney, Agent, or Firm* — Oblon, McClelland, Maier & Neustadt, L.L.P.

(57) ABSTRACT

A locking and unlocking control system includes: a first information acquisition part configured to acquire presence information as to whether a parcel associated with a first user is present in a predetermined region defined in a vehicle or a facility, the predetermined region having a door configured to be locked and unlocked through a locking and unlocking process performed by a locking and unlocking control device; and a locking and unlocking control part configured to execute a predetermined process so as not to permit unlocking of the door by a second user when the locking and unlocking control part determines based on the presence information that the parcel is present in the predetermined region and when the door is locked.

20 Claims, 12 Drawing Sheets

(56) References Cited

U.S. PATENT DOCUMENTS

| | | | |
|---|---|---|---|
| 2016/0098876 A1* | 4/2016 | Oz | G07C 5/008 |
| | | | 340/5.61 |
| 2016/0099927 A1* | 4/2016 | Oz | H04L 63/08 |
| | | | 726/9 |
| 2016/0265253 A1 | 9/2016 | Hild et al. | |
| 2016/0267738 A1* | 9/2016 | Carstens | A47G 29/141 |
| 2016/0269168 A1 | 9/2016 | Carstens et al. | |
| 2016/0275733 A1 | 9/2016 | Carstens et al. | |
| 2016/0275735 A1 | 9/2016 | Carstens et al. | |
| 2016/0275740 A1 | 9/2016 | Hild et al. | |
| 2016/0275741 A1 | 9/2016 | Carstens et al. | |
| 2016/0342944 A1* | 11/2016 | Wiechers | G06Q 10/0836 |
| 2017/0024693 A1* | 1/2017 | Wiechers | G06Q 10/0833 |
| 2017/0124510 A1 | 5/2017 | Caterino et al. | |
| 2017/0286905 A1* | 10/2017 | Richardson | G06Q 10/0832 |
| 2017/0287244 A1* | 10/2017 | Jansen | A47G 29/141 |
| 2018/0096270 A1* | 4/2018 | High | G06Q 10/0633 |
| 2018/0151013 A1 | 5/2018 | Carstens et al. | |
| 2018/0158265 A1* | 6/2018 | Lyman | G08B 13/00 |
| 2018/0165640 A1* | 6/2018 | Wilkinson | G07C 9/00571 |
| 2018/0181126 A1* | 6/2018 | Seaman | B60R 25/01 |
| 2018/0240067 A1* | 8/2018 | Oz | G06Q 10/08 |
| 2019/0005445 A1* | 1/2019 | Bahrainwala | G06Q 10/0833 |
| 2019/0114585 A1* | 4/2019 | Fee | G06Q 10/0836 |
| 2019/0130348 A1* | 5/2019 | Mellado | G06Q 10/0832 |

* cited by examiner

FIG. 3

| REQUESTING USER ID | COLLECTION/ DELIVERY CATEGORY | COLLECTION/DELIVERY DATE AND TIME | COLLECTION/ DELIVERY LOCATION | COLLECTION/ DELIVERY STATUS | PARCEL ATTRIBUTE | ACCESS PERMISSION CONDITION |
|---|---|---|---|---|---|---|
| S001 | DELIVERY | 2017/11/01 12:00 - 15:00 | VEHICLE | COMPLETED | ... | PERMITTED |
| S001 | COLLECTION | 2017/11/02 18:00 - 20:00 | VEHICLE | COMPLETED | ... | NOT PERMITTED |
| S001 | DELIVERY | 2017/11/03 9:00 - 12:00 | VEHICLE | NOT COMPLETED | ... | NOT PERMITTED |

FIG. 4

| REQUESTING USER ID | VEHICLE TYPE | COLOR | NUMBER | VEHICLE POSITION |
|---|---|---|---|---|
| S001 | ... | WHITE | XXYY | ... |

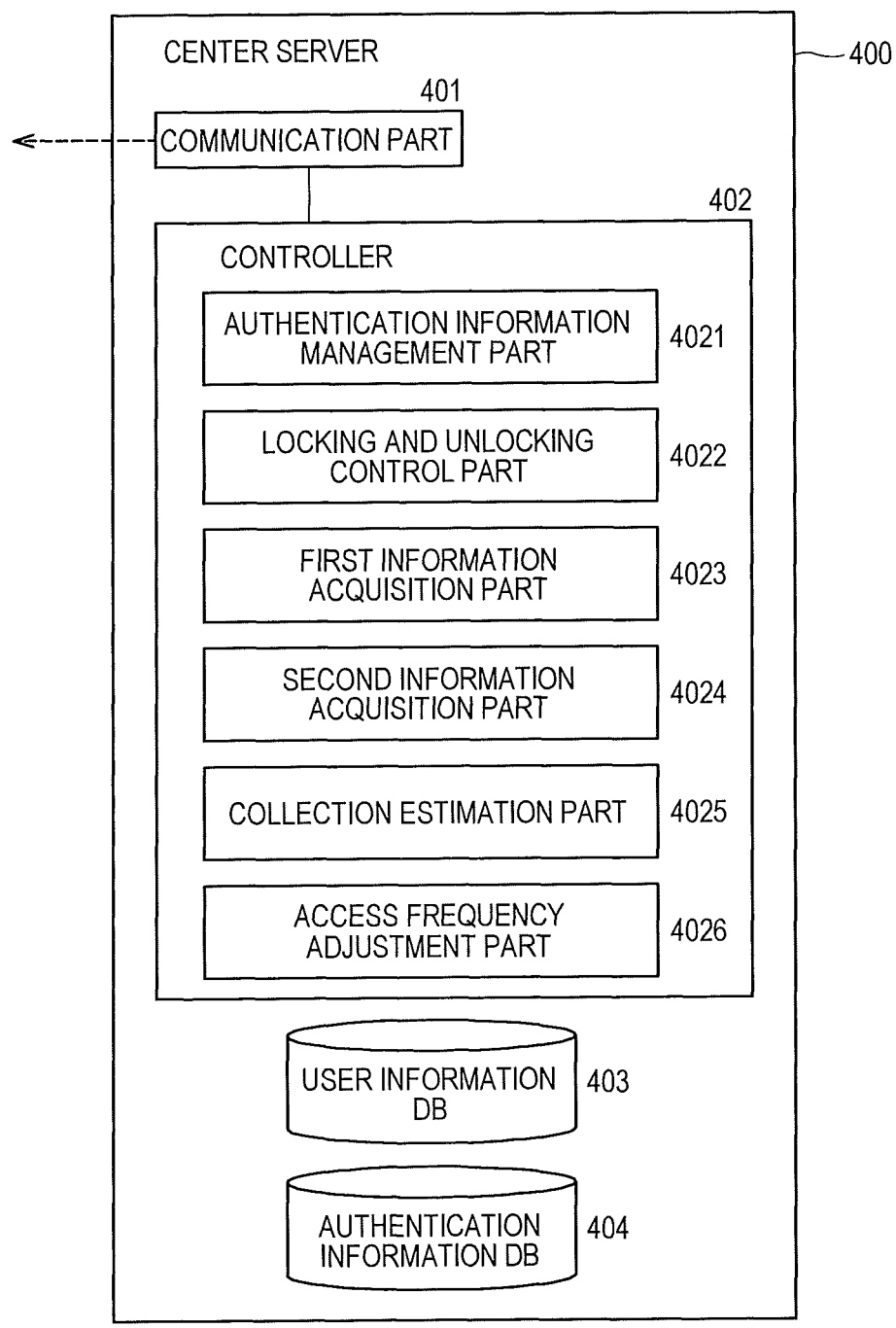

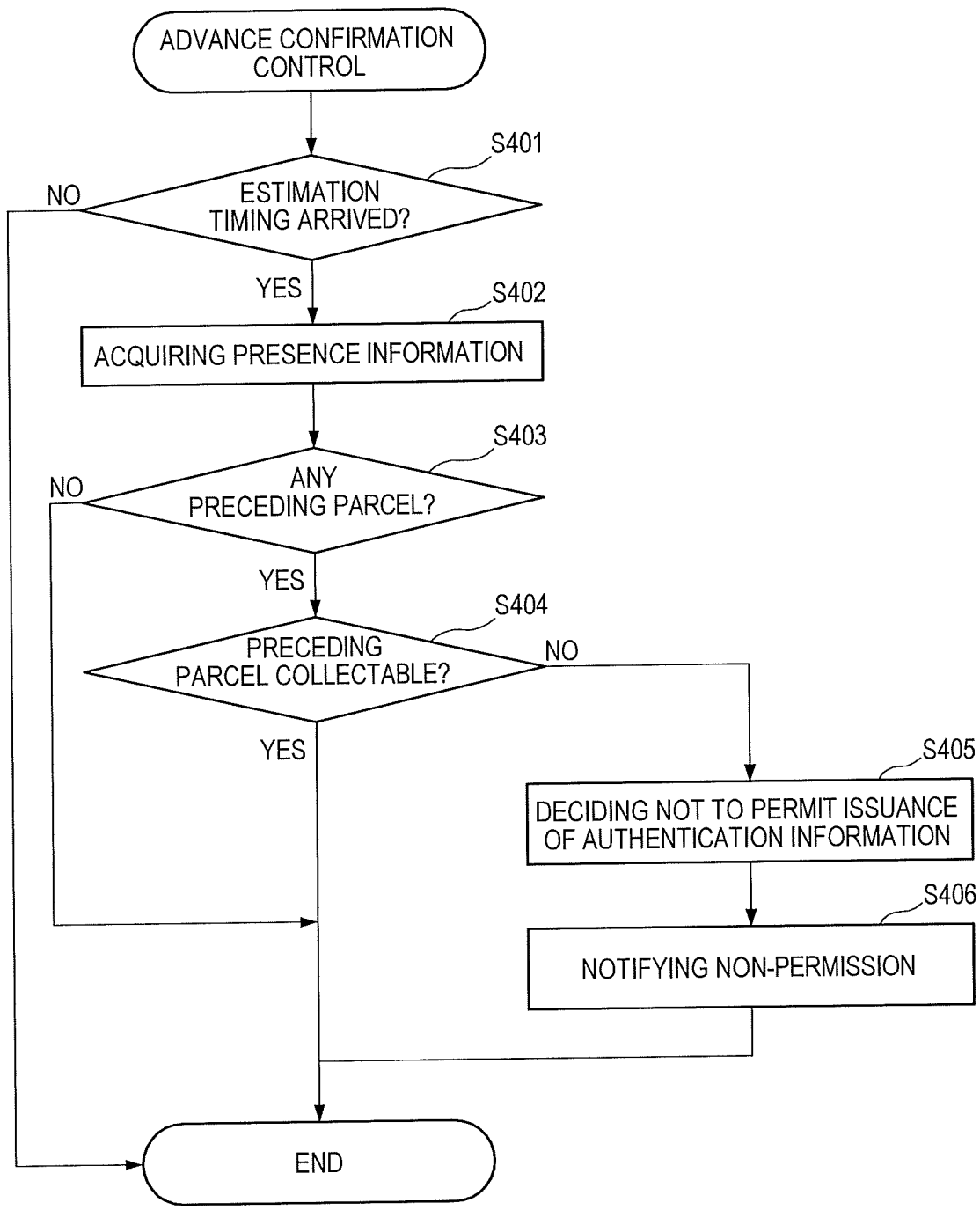

LOCKING AND UNLOCKING CONTROL SYSTEM AND LOCKING AND UNLOCKING CONTROL METHOD

INCORPORATION BY REFERENCE

The disclosure of Japanese Patent Application No. 2017-235832 filed on Dec. 8, 2017 including the specification, drawings and abstract is incorporated herein by reference in its entirety.

BACKGROUND

1. Technical Field

The disclosure relates to a locking and unlocking control system and a locking and unlocking control method.

2. Description of Related Art

In recent years, as means for efficiently delivering an object to be collected and delivered (parcel) between a user of collection and delivery services and a delivery company carrying out collection and delivery, there has been developed a trunk sharing system in which a cargo compartment of a vehicle designated by a user is used as a delivery location of the object to be collected and delivered. For example, Japanese Unexamined Patent Application Publication No. 2006-206225 (JP 2006-206225A) discloses a system in which when collecting and delivering an object to be collected and delivered, an authentication process is performed between a collection/delivery communication device of a delivery company and a vehicle communication device mounted on a designated vehicle, and locking and unlocking of the designated vehicle becomes possible when authentication is successful.

SUMMARY

In a system for collecting and delivering a parcel using a vehicle like the trunk sharing system described above, when a plurality of users attempts to use the vehicle, security for the parcel arranged in the vehicle may become a concern in some cases. For example, when a plurality of delivery companies intends to deliver parcels to a vehicle, if delivery by one delivery company is performed in a state in which a parcel previously delivered by another delivery company remains in the vehicle, the one delivery company may touch the already delivered parcel. Thus, security for the parcel may become a concern. Also, when a parcel is collected by one delivery company using a vehicle, security may also become a concern if delivery of a parcel is performed by another delivery company before the one delivery company scheduled to collect a parcel arrives at the vehicle.

In addition, concern about security for a parcel is not limited to the case when a plurality of delivery companies uses a vehicle. For example, one vehicle user may arrange a parcel in a predetermined region of a vehicle for a predetermined purpose (for collection of the parcel by a delivery company, for delivery of the parcel to a third party, and the like). In this state, another vehicle user may derive the vehicle and may desire to temporarily use the predetermined region at that time. Such a case is likely to occur when sharing a trunk of a vehicle (a region corresponding to the predetermined region) and also sharing a vehicle itself. Similar problems may arise when a predetermined region in a predetermined facility is used for delivery of a parcel.

The disclosure provides a technique that contributes to, in a system for controlling a user's access to a predetermined region in a vehicle or a facility configured to be locked and unlocked, the improvement of security for a parcel already arranged in the predetermined region.

The present applicant has proposed that, in a state in which a parcel is arranged in a predetermined region in a vehicle or a facility by one user, a predetermined process is performed so as not to allow another user to access the predetermined region. That is to say, the predetermined process restricts access of another user to the predetermined region, and the security is improved as a result.

A first aspect of the disclosure provides a locking and unlocking control system. The locking and unlocking control system includes a first information acquisition part configured to acquire presence information as to whether a parcel associated with a first user is present in a predetermined region, the predetermined region being defined in a vehicle or a facility, the predetermined region having a door configured to be locked and unlocked through a locking and unlocking process, and the locking and unlocking process being performed by a locking and unlocking control device; and locking and unlocking control part configured to execute a predetermined process so as not to permit unlocking of the door by a second user different from the first user when an access prohibition condition including both of following conditions are satisfied: (i) the locking and unlocking control part determines, based on the presence information, that the parcel is present in the predetermined region, and (ii) the door is locked.

With the above configuration, when the parcel associated with the first user is present in the predetermined region and when the predetermined region is locked, the second user is not permitted to unlock the predetermined region. Thus, the second user cannot access the parcel. As a result, it is possible to maintain high security of the parcel associated with the first user.

In the first aspect, the system may be configured to control, by issuing predetermined authentication information for causing the locking and unlocking control device to execute the locking and unlocking process, to a user terminal of each of the users at least including the second user, access of users including at least the second user to the predetermined region. With the above configuration, by the interaction between the user terminal and the locking and unlocking control device, it is possible to cause the locking and unlocking control device to execute the locking and unlocking process.

In the first aspect, when the locking and unlocking control part receives a permission request signal requesting permission to lock and unlock the door from the user terminal of the second user, the locking and unlocking control part may be configured to execute, as the predetermined process, a process of not performing issuance of the authentication information for the second user when the access prohibition condition is satisfied. As a result of adopting such a predetermined process, when the parcel associated with the first user is present in the predetermined region and when the predetermined region is locked, the second user authentication information is not issued to the user terminal of the second user. Therefore, the second user cannot cause the locking and unlocking control device to execute the locking and unlocking process using the user terminal, whereby the unlocking of the predetermined region by the second user is not permitted.

In the first aspect, the locking and unlocking control part may be configured to execute, as the predetermined process, a process of invalidating the authentication information for the second user already issued to the user terminal of the second user. As a result of adopting such a predetermined process, when the parcel associated with the first user is present in the predetermined region and when the predetermined region is locked, even if the second user authentication information has been already issued to the user terminal of the second user, the second user authentication information is invalidated and the locking and unlocking process using the second user authentication information is not realized.

In the first aspect, the locking and unlocking control system may further include a second information acquisition part configured to acquire information on an access permission condition for permitting access to the predetermined region by the second user even when the parcel is present in the predetermined region, wherein the locking and unlocking control part may be configured: to permit the second user to unlock the door by not executing the predetermined process when the parcel satisfies the access permission condition, even when the access prohibition condition is satisfied; and not to permit the second user to unlock the door by executing the predetermined process when the parcel does not satisfy the access permission condition, when the access prohibition condition is satisfied.

With this configuration, as for a parcel for which high security is not required, the second user can access the predetermined region regardless of the presence of the parcel in the predetermined region by way of the setting of the access permission condition.

In the first aspect, the second information acquisition part may be configured to acquire the access permission condition set by the first user.

In the first aspect, the vehicle or the facility may include an alternative region independent from the predetermined region, the alternative region having a second door controlled to be locked and unlocked via the user terminal of the second user and the locking and unlocking control device so as to allow the second user to access the alternative region; and when the access prohibition condition is satisfied, the locking and unlocking control part may be configured to permit unlocking of the second door by the second user by issuing alternative region authentication information for allowing the second user to unlock the second door. By adopting such a configuration, even when the parcel associated with the first user is present in the predetermined region, the second user can use the alternative region. At this time, the unlocking of the predetermined region by the second user is not permitted. Therefore, the security of the parcel associated with the first user is maintained at a high level.

In the first aspect, when the locking and unlocking control part executes the predetermined process, the locking and unlocking control part may be configured to issue the alternative region authentication information after not permitting the second user to unlock the predetermined region.

In the first aspect, the locking and unlocking control system may include a collection estimation part configured to estimate, based on a presence position of the first user, whether the parcel is to be collected by the first user at a timing that is a predetermined period of time earlier than the predetermined time, when the access by the second user to the predetermined region is scheduled at a predetermined time and when the locking and unlocking control part determines, based on the presence information, that the parcel is present in the predetermined region, wherein the locking and unlocking control part may be configured to execute, when the collection estimation part estimates that the parcel is not to be collected, the predetermined process before the predetermined time so as not to permit the second user to unlock the door of the predetermined region, and notify the second user that the unlocking of the door of the predetermined region is not permitted.

By adopting such a configuration in the control system, while maintaining high security of the parcel associated with the first user, the second user can know at a relatively early timing that the use of the predetermined region is not possible. Thus, it would be easy for the second user to manage his/her behavior without wasting time. Therefore, the above-mentioned predetermined period of time can be appropriately determined in consideration of the convenience of the second user and the possibility of collection of the parcel by the first user. The estimation by the collection estimation part as to whether the parcel is to be collected by the first user is performed based on the presence position of the first user. For example, a time required for the first user to reach the position of the vehicle or the facility may be calculated based on the distance between the presence position of the first user and the location of the vehicle or the facility. The time thus calculated may be compared with the above-mentioned predetermined period of time. Then, the possibility of collection of the parcel may be estimated.

In the first aspect, the locking and unlocking control system may further include an access frequency adjustment part configured to acquire information on a collection time at which the parcel arranged in the predetermined region is to be collected by the first user, and adjust, based on the collection time, an issuance frequency of the authentication information for users other than the first user, including the second user, for allowing the users other than the first user to access the predetermined region. By adopting such a configuration, the frequency with which the users other than the first user can access the predetermined region is adjusted according to the collection time, and the excessive issuance of the authentication information is suppressed. As a result, it is possible to avoid a situation where the parcel associated with the first user is left in the predetermined region without being collected, whereby the users other than the first user cannot use the predetermined region as planned.

A second aspect of the disclosure provides a locking and unlocking control method. The locking and unlocking control method includes: acquiring presence information as to whether a parcel associated with a first user is present in a predetermined region, the predetermined region being defined in a vehicle or a facility, and the predetermined region having a door configured to be locked and unlocked through a locking and unlocking process performed by a locking and unlocking control device; and executing a predetermined process so as not to permit unlocking of the door by a second user different from a first user when it is determined, based on the presence information, that the parcel is present in the predetermined region and when the door is locked.

In the second aspect, access to the predetermined region by users including at least the second user may be controlled by issuing, to a user terminal of each of the users including at least the second user, predetermined authentication information for allowing the locking and unlocking control device to execute the locking and unlocking process.

In the second aspect, the executing the predetermined process may include upon receiving a permission request signal requesting permission to lock and unlock the door from the user terminal of the second user, executing, as the predetermined process, a process of not issuing authentication information for the second user, when it is determined that the parcel is present in the predetermined region and when the door is locked.

In the second aspect, the executing the predetermined process may include executing, as the predetermined process, a process of invalidating the authentication information for the second user already issued to the user terminal of the second user.

According to the disclosure, in the system that controls a user's access to a predetermined region in a vehicle or a facility configured to be locked and unlocked, it is possible to improve the security for a parcel already arranged in the predetermined region.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a diagram showing a data structure of collection/delivery information stored in the collection/delivery management server;

FIG. 4 is a diagram showing a data structure of vehicle management information stored in the collection/delivery management server;

FIG. 11 is a diagram showing a configuration of a center server according to a fourth embodiment of the disclosure; and FIG. 12 is a flowchart of preliminary confirmation control executed by the center server according to the fourth embodiment of the disclosure.

DETAILED DESCRIPTION OF EMBODIMENTS

Hereinafter, specific embodiments of the disclosure will be described with reference to the drawings. The configurations described in the embodiments are not intended to limit the technical scope of the disclosure only thereto unless otherwise mentioned.

First Embodiment

<System Configuration>

Figure 1:
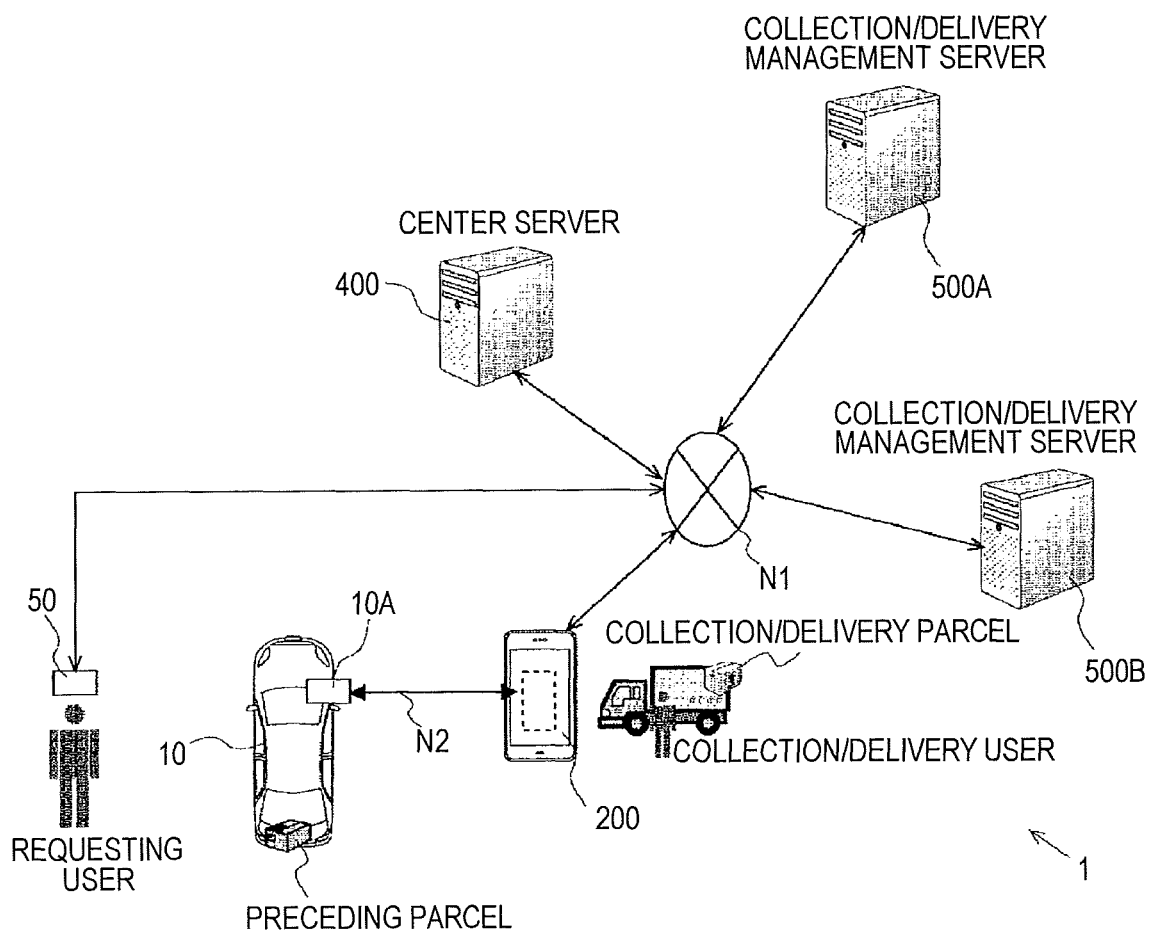
FIG. 1 is a diagram showing a schematic configuration of a trunk sharing system including a control system according to a first embodiment of the disclosure.

FIG. 1 is a diagram showing a schematic configuration of a trunk sharing system 1 according to the present embodiment. The trunk sharing system 1 is a system that realizes a collection/delivery service using a cargo compartment (trunk room) as a delivery location by allowing the cargo compartment of a vehicle 10 designated by a person (requester) who requests a collection/delivery work of an object to be collected and delivered (parcel) to be shared between the requester and a person who carries out the requested collection/delivery work of the object to be collected and delivered. Therefore, "a person who requests a collection/delivery work of an object to be collected and delivered" and "a person who carries out the requested collection/delivery work of the object to be collected and delivered" are users who use the cargo compartment of a vehicle. In order to distinguish between the two users, the former will be referred to as "requesting user", and the latter will be referred to as "collection/delivery user." Further, the cargo compartment is a predetermined region in the vehicle 10, in which a collected/delivered parcel is arranged. The cargo compartment is also configured to be locked and unlocked by an in-vehicle device 10A as described later. The cargo compartment is a region partitioned so that the region is not accessible to and from a passenger compartment of the vehicle 10 on which a driver and the like, boards.

In the example of FIG. 1, the trunk sharing system 1 includes the in-vehicle device 10A installed in the vehicle 10, a user terminal 200 of a collection/delivery user, a user terminal 50 of a requesting user, a center server 400, and collection/delivery management servers 500A and 500B. The in-vehicle device 10A, the user terminal 200, the user terminal 50, the center server 400, and the collection/delivery management servers 500A and 500B are mutually connected by a network N1. The network N1 may be, for example, a worldwide public communication network, such as the Internet. A wide area network (WAN) or other communication networks may be adopted as the network N1. Further, the network N1 may include a telephone communication network such as a cellular phone or the like and a wireless communication network such as Wi-Fi or the like. The in-vehicle device 10A is connected to the user terminal 200 of the collection/delivery user via a network N2 including a short-range wireless communication network or the like. Although the trunk sharing system 1 illustratively includes two collection/delivery management servers 500A and 500B, three or more collection/delivery management servers may be included in the trunk sharing system 1. When referring collectively to the collection/delivery management servers in the present specification, the reference numeral thereof is 500.

The collection/delivery management server 500 accepts registration of an article to be collected and delivered (hereinafter also referred to as "collection/delivery parcel") from the user terminal 50 of the requesting user. For example, when asking the collection/delivery user to deliver an article purchased at a product purchase site opened by an electronic commerce business operator as a collection/delivery parcel, the requesting user may register collection/delivery information on the collection/delivery parcel in the collection/delivery management server 500 by means of an application (hereinafter also referred to as a predetermined application) that is installed in the user terminal 50 of the requesting user to allow the requesting user to use a service offered by the trunk sharing system 1. As shown in FIG. 3 to be described later, the collection/delivery information includes identification information of the requesting user, schedule information of delivery and collection, and the like. In the collection/delivery management server 500, the identification information of the requesting user is also associated in advance with the vehicle 10 linked with the requesting user. The requesting user appropriately selects a collection/delivery location to be used from collection/delivery location candidates related to the requesting user, including the vehicle 10. The collection/delivery location thus selected is also included in the collection/delivery information. In the following description, explanation will be made under the assumption that the vehicle 10 is a delivery/delivery location of the requesting user. In addition, the collection/delivery information also includes status information on a collection/delivery parcel. Examples of the status information may further include information as to whether the collection and delivery of the collection/delivery parcel is completed, and the like.

In addition, it is assumed that the collection/delivery management server 500A and the collection/delivery management server 500B shown in FIG. 1 are managed by different delivery companies. Consequently, the collection and delivery of a collection/delivery parcel according to the collection/delivery information managed by the collection/delivery management server 500A is performed by a delivery company different from the delivery company that performs the collection and delivery of a collection/delivery parcel according to the collection/delivery information managed by the collection/delivery management server 500B. Hereinafter, when distinctively representing the collection/delivery users belonging to the respective delivery companies that manage the collection/delivery management servers 500A and 500B, suffixes will be added to denote the two users just like a collection/delivery user A and a collection/delivery user B, respectively.

Upon receiving a request for collection and delivery of a parcel from the user terminal 50 of the requesting user, if the collection/delivery location is the vehicle 10, the collection/delivery management server 500 requests the center server 400 to issue authentication information for locking and unlocking a cargo compartment of the vehicle 10 accommodating a collection/delivery parcel to the user terminal 200 of the collection/delivery user. This request is made by using a request from the user terminal 200 of the collection/delivery user as a trigger. Based on the identification information of the requesting user included in the collection/delivery information, the center server 400 transmits the authentication information of the vehicle 10 associated with the identification information of the requesting user to the user terminal 200 of the collection/delivery user via the collection/delivery management server 500. The collection/delivery user can access the cargo compartment of the vehicle 10 to deliver or collect the collection/delivery parcel by locking and unlocking the cargo compartment of the vehicle 10 using the authentication information acquired by the user terminal 200. In this regard, the authentication information is digital information that is transmitted from the user terminal 200 to the in-vehicle device 10A via short-range wireless communication and subjected to an authentication process by the in-vehicle device 10A to cause the in-vehicle device 10A to execute a locking and unlocking process of the cargo compartment of the vehicle 10. The locking and unlocking process of the cargo compartment of the vehicle 10 is a process of locking and unlocking a door of the cargo compartment of the vehicle 10 accommodating a collection/delivery parcel by the in-vehicle device 10A that will be described in detail later.

In the disclosure, the authentication information is not limited to a specific format but may be a format that enables execution of the locking and unlocking process. As an example, the authentication information may include time information for executing the locking and unlocking process. When a plurality of regions to be locked and unlocked by the locking and unlocking control device is present in the vehicle or the facility, the authentication information may include information for designating a region to be subjected to the locking and unlocking process.

Figure 2:
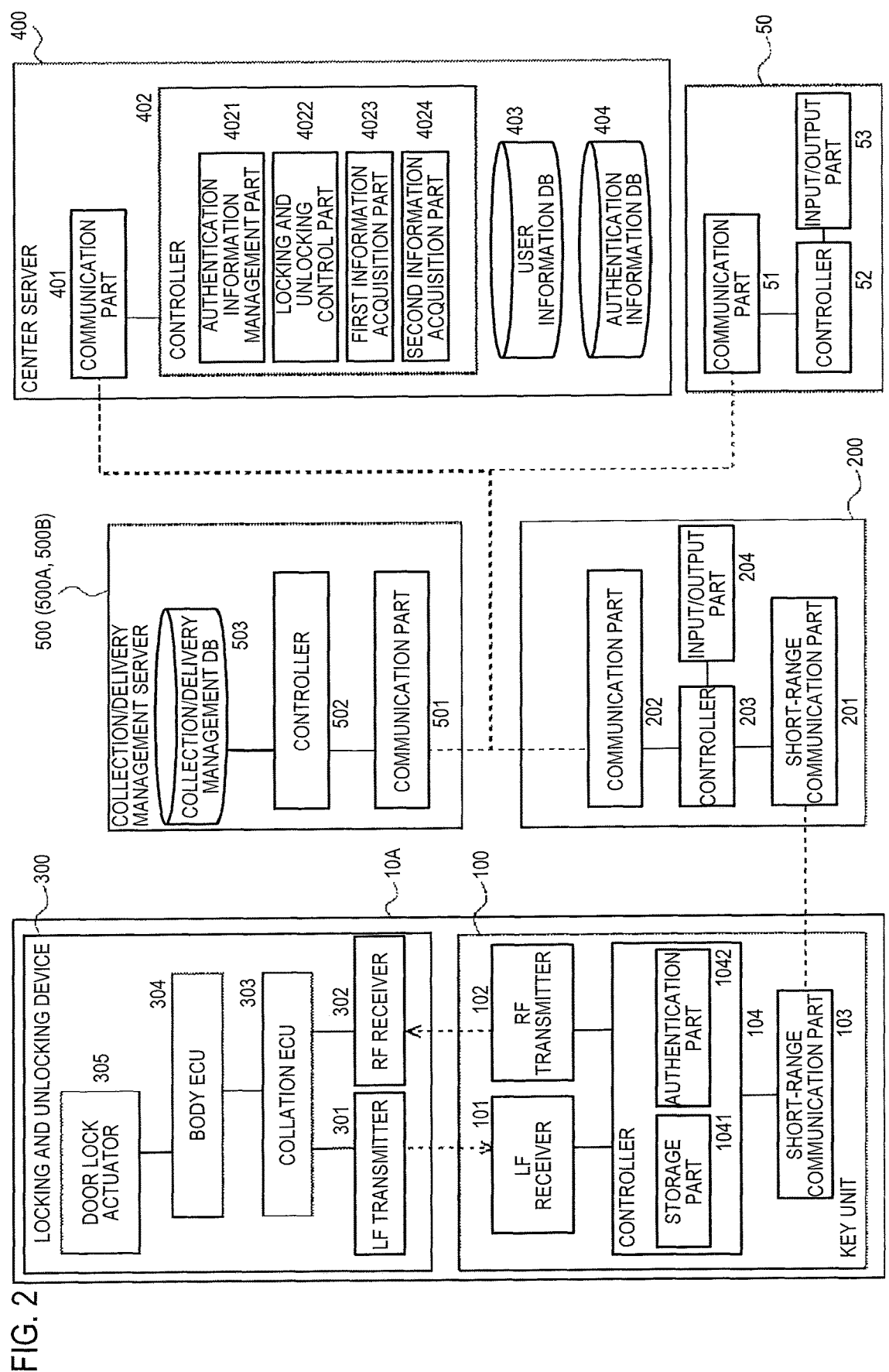
FIG. 2 is a diagram showing a detailed configuration of an in-vehicle device, a user terminal, a center server, and a collection/delivery management server, that constitute the trunk sharing system shown in FIG. 1.

FIG. 2 is a block diagram schematically illustrating a configuration of each of the in-vehicle device 10A, the user terminal 200 of the collection/delivery user, the user terminal 50 of the requesting user, the collection/delivery management server 500, and the center server 400 that constitute the trunk sharing system 1. Hardware configuration and functional configuration of the in-vehicle device 10A, the user terminal 200 of the collection/delivery user, the user terminal 50 of the requesting user, the collection/delivery management server 500, and the center server 400 will be described with reference to FIG. 2.

The in-vehicle device 10A functions as a locking and unlocking control device in the embodiment, with including a key unit 100 and a locking and unlocking device 300. The key unit 100 has a wireless interface similar to an electronic key of a smart key (hereinafter referred to as a portable device) and communicates with the existing locking and unlocking device 300 of the in-vehicle device 10A, whereby the key unit 100 can perform the locking and unlocking of a cargo compartment or a passenger compartment of the vehicle 10 (hereinafter simply referred to also as "the locking and unlocking of the vehicle 10" when it is not necessary to distinguish between the cargo compartment and the passenger compartment) without using a physical key. Further, the key unit 100 performs short-range wireless communication with the user terminal 200 of the collection/delivery user and determines whether to serve as an electronic key of the vehicle 10, based on the authentication process result of the user terminal 200 of the collection/delivery user.

When gaining access to the cargo compartment of the vehicle 10 for the delivery and collection of a collection/delivery parcel, the user terminal 200 of the collection/delivery user causes the center server 400 to issue authentication information for locking and unlocking the cargo compartment via the collection/delivery management server 500 as described above. The authentication information transmitted from the user terminal 200 of the collection/delivery user to the key unit 100 is collated with the authentication information stored in advance in the key unit 100. If the authentication process is successful, the user terminal 200 is authenticated as a terminal for rightfully activating the in-vehicle device 10A. If the user terminal 200 is authenticated, the key unit 100 transmits, together with a locking/unlocking signal, a key ID of the vehicle 10 stored in advance in the key unit 100 and associated with the authentication information to the locking and unlocking device 300. The locking and unlocking device 300 locks and unlocks the vehicle 10 when the key ID received from the key unit 100 matches the key ID stored in advance in the locking and unlocking device 300. The key unit 100 and the locking and unlocking device 300 are operated with the electric power supplied from a battery mounted on the vehicle 10. The key ID stored in advance in the key unit 100 may be encrypted by the authentication information. In this case, if the authentication process of the user terminal 200 of the collection/delivery user is successful, the key unit 100 may decrypt the key ID with the authentication information and then transmit the decrypted key ID to the locking and unlocking device 300.

Details of the locking and unlocking device 300 will now be described. The locking and unlocking device 300 is a device for locking and unlocking a door of a passenger compartment or a cargo compartment of the vehicle 10. For example, the locking and unlocking device 300 locks and unlocks the door of the vehicle 10 in response to a locking signal and an unlocking signal transmitted from a portable device corresponding to the vehicle 10 via radio waves of a radio frequency (hereinafter referred to as RF) band. In addition, the locking and unlocking device 300 has a function of transmitting radio waves of a low frequency (hereinafter referred to as LF) band for searching for a portable device.

In the present embodiment, instead of the aforementioned portable device, the key unit 100 transmits and receives radio waves of an RF band and an LF band to and from the locking and unlocking device 300, thereby controlling the locking and unlocking of the door of the vehicle 10. Hereinafter, unless otherwise mentioned, description will be made while the communication destination of the locking and unlocking device 300 is limited to the key unit 100.

The locking and unlocking device 300 includes an LF transmitter 301, an RF receiver 302, a collation ECU 303, a body ECU 304, and a door lock actuator 305. The LF transmitter 301 is means for transmitting radio waves of a low frequency band (for example, 100 KHz to 300 KHz) for searching for (polling) the key unit 100. For example, the LF transmitter 301 is built in the vicinity of a center console and a steering wheel in the passenger compartment. The RF receiver 302 is means for receiving radio waves of a high frequency band (for example, 100 MHz to 1 GHz) transmitted from the key unit 100. The RF receiver 302 is built in an arbitrary location in the passenger compartment.

The collation ECU 303 is a computer that performs control of the locking and unlocking of the door of the passenger compartment or the cargo compartment of the vehicle 10 based on a signal (the locking signal or the unlocking signal) transmitted from the key unit 100 via radio waves of an RF band. The collation ECU 303 is constituted by, for example, a microcomputer. In the following description, the locking signal and the unlocking signal are collectively referred to as a locking/unlocking signal. The term "locking/unlocking signal" represents at least one of the locking signal and the unlocking signal.

The collation ECU 303 authenticates that the locking/unlocking signal transmitted from the key unit 100 is a signal transmitted from an authorized device. Specifically, the collation ECU 303 determines whether the key ID included in the locking/unlocking signal coincides with the key ID stored in advance in the storage part (not shown) of the collation ECU 303. The collation ECU 303 transmits an unlocking command or a locking command to the body ECU 304 based on the result of this determination. The unlocking command or the locking command is transmitted via an in-vehicle network such as a controller area network (CAN) or the like.

The door lock actuator 305 is an actuator that locks and unlocks the door of the vehicle 10 (the door of the passenger compartment opened and closed at the time of getting on and off from the passenger compartment serving as a boarding space or the door of the cargo compartment opened and closed at the time of loading and unloading a parcel into and from the cargo compartment). The door lock actuator 305 is operated based on a signal transmitted from the body ECU 304. The door lock actuator 305 may be configured so as to be able to independently lock and unlock the passenger compartment door and the cargo compartment door of the vehicle 10.

The body ECU 304 is a computer that performs body control of the vehicle 10. The body ECU 304 has a function of controlling the door lock actuator 305 based on the unlocking command or the locking command received from the collation ECU 303, thereby simultaneously or independently performing the unlocking and locking of the passenger compartment door or the cargo compartment door of the vehicle 10. The collation ECU 303 and the body ECU 304 may be integrated.

Next, the key unit 100 will be described. The key unit 100 is a device arranged at a predetermined position (for example, inside a glove box) in the passenger compartment of the vehicle 10. The key unit 100 has a function of performing short-range wireless communication with the user terminal 200 of the collection/delivery user to authenticate the user terminal 200 and a function of transmitting the locking/unlocking signal based on the authentication result by using radio waves of an RF band. The key unit 100 includes an LF receiver 101, an RF transmitter 102, a short-range communication part 103, and a controller 104.

The LF receiver 101 is means for receiving a polling signal transmitted from the locking and unlocking device 300 via radio waves of an LF band. The LF receiver 101 includes an antenna (hereinafter referred to as LF antenna) for receiving radio waves of an LF band. The RF transmitter 102 is means for transmitting the locking/unlocking signal to the locking and unlocking device 300 via radio waves of an RF band.

The short-range communication part 103 is means for communicating with the user terminal 200 of the collection/delivery user. The short-range communication part 103 performs communication at a short distance (to the extent that communication can be performed inside and outside the passenger compartment) using a predetermined wireless communication standard. In the present embodiment, the short-range communication part 103 performs data communication according to the Bluetooth (registered trademark) Low Energy standard (hereinafter referred to as BLE). BLE is a low power communication standard based on Bluetooth, and has a feature that communication can be started immediately by detecting a partner without requiring pairing between devices. Although BLE is exemplified in the present embodiment, other wireless communication standards may also be used. For example, near field communication (NFC), ultra wide band (UWB), Wi-Fi (registered trademark), and the like may be used.

The controller 104 is a computer that performs short-range wireless communication with the user terminal 200 of the collection/delivery user via the short-range communication part 103 and performs control for authenticating the user terminal 200 and control for transmitting the locking/unlocking signal based on the authentication result. The controller 104 is constituted by, for example, a microcomputer.

The controller 104 includes a storage part 1041 and an authentication part 1042. In the storage part 1041, a control program for controlling the key unit 100 is stored. The controller 104 may realize various functions including the authentication part 1042 by executing the control program stored in the storage part 1041 by a CPU (not shown). For example, the controller 104 realizes a function of receiving the polling signal transmitted as radio waves of an LF band from the locking and unlocking device 300 via the LF receiver 101, a function of transmitting the locking/unlocking signal as radio waves of an RF band to the locking and unlocking device 300 via the RF transmitter 102, a function of processing the communication with the user terminal 200 of the collection/delivery user performed via the short-range communication part 103, a function of generating the locking/unlocking signal if the authentication of the user terminal 200 of the collection/delivery user by the authentication part 1042 is successful, and the like.

The authentication part 1042 performs authentication of the user terminal 200 based on the authentication information included in a locking request or an unlocking request (hereinafter generically referred to as a locking/unlocking request) transmitted from the user terminal 200 of the collection/delivery user. Specifically, the authentication part 1042 compares the authentication information stored in the storage part 1041 with the authentication information transmitted from the user terminal 200 of the collection/delivery user. If the two kinds of authentication information are in a predetermined relationship, the authentication part 1042 determines that the authentication is successful. If the two kinds of authentication information do not satisfy the predetermined relationship, the authentication part 1042 determines that the authentication is failed. As used herein, the term "predetermined relationship" includes not only a case where the authentication information stored in the storage part 1041 matches the authentication information transmitted from the user terminal 200 of the collection/delivery user, but also a case where the predetermined processing results such as encryption and decryption using the two kinds of authentication information match each other and a case where the result of performing a decryption process on one of the two kinds of authentication information matches the other one of the two kinds of authentication information.

When the authentication part 1042 successfully authenticates the user terminal 200 of the collection/delivery user, the locking/unlocking signal generated according to the request received from the user terminal 200 is transmitted to the locking and unlocking device 300 via the RF transmitter 102. Hereinafter, if required for explanation, the authentication information stored in the key unit 100 will be referred to as device authentication information, and the authentication information transmitted from the user terminal 200 of the collection/delivery user will be referred to as terminal authentication information.

In addition, the key unit 100 transmits the key ID together with the locking/unlocking signal to the locking and unlocking device 300. The key ID may be stored in advance in the key unit 100 in a plain text state or may be stored in the user terminal 200 of the collection/delivery user in a state in which the key ID is encrypted with a unique cipher. When the key ID is stored in an encrypted state, the encrypted key ID may be decrypted by the authentication information transmitted from the user terminal 200 of the collection/delivery user so that the original key ID can be obtained.

In this manner, the in-vehicle device 10A executes a series of processes of activating the locking and unlocking device 300 through the authentication process by the key unit 100 and locking or unlocking the passenger compartment or the cargo compartment of the vehicle 10, by using the authentication information transmitted from the user terminal 200 as a trigger. In the embodiment, this series of processes is a locking and unlocking process performed by the in-vehicle device 10A and functions as a locking and unlocking process performed by the locking and unlocking control system.

Next, the user terminal 200 of the collection/delivery user will be described. The user terminal 200 is a small computer, such as a smartphone, a mobile phone, a tablet terminal, a personal information terminal, a wearable computer (smart watch and the like) or the like. The user terminal 200 may be a personal computer (PC) connected to the collection/delivery management server 500 via the network N1 that is a public communication network, such as the Internet. The user terminal 200 of the collection/delivery user has a short-range communication part 201, a communication part 202, a controller 203, and an input/output part 204.

The short-range communication part 201 is means for communicating with the key unit 100 according to the same communication standard as that of the short-range communication part 103 of the key unit 100. A network formed between the short-range communication part 201 and the key unit 100 is represented by the reference symbol N2 in FIG. 1. The communication part 202 is communication means for connecting the user terminal 200 to the network N1. In the present embodiment, the user terminal 200 may communicate with another device (for example, the collection/delivery management server 500 or the like) via the network N1 by using a mobile communication service such as $3^{rd}$ generation (3G) or long term evolution (LTE).

The controller 203 is a computer that controls the user terminal 200. For example, the controller 203 performs a process of acquiring the above-described terminal authentication information, a process of generating a locking/unlocking request including the acquired terminal authentication information, a process of transmitting the generated locking/unlocking request to the key unit 100, and the like. The controller 203 is constituted by, for example, a microcomputer. The function for performing the above-described various processes is realized by causing a CPU (not shown) to execute a program stored in storage means (ROM or the like).

Further, the controller 203 performs interaction with the collection/delivery user via the input/output part 204. The input/output part 204 is means for receiving an input operation performed by the collection/delivery user and presenting information to the collection/delivery user. Specifically, the input/output part 204 consists of a touch panel and control means for the touch panel, and a liquid crystal display and control means for the liquid crystal display. In the present embodiment, the touch panel and the liquid crystal display are composed of one touch panel display.

The controller 203 displays an operation screen on the input/output part 204 and generates the locking/unlocking request according to an operation performed by the collection/delivery user. For example, the controller 203 outputs an unlocking operation icon, a locking operation icon or the like to the touch panel display and generates the unlocking request or the locking request based on the operation performed by the collection/delivery user. The operation performed by the collection/delivery user is not limited to the operation performed via the touch panel display. For example, the operation performed by the collection/delivery user may be an operation performed via a hardware switch or the like.

Further, the controller 203 performs a process of acquiring the terminal authentication information from the center server 400. The terminal authentication information is not information (key ID) for the locking and unlocking device 300 to authenticate the key unit 100 but is information for the key unit 100 to authenticate the user terminal 200 (for example, authentication information corresponding to the authentication information peculiar to the key unit 100 mounted on the vehicle 10). Specifically, the controller 203 transmits, through the communication part 202, a request for issuance of terminal authentication information to the center server 400 via the collection/delivery management server 500. The "request for issuance of terminal authentication information" referred to herein includes the identification information of the user terminal 200 and a signal requesting the issuance of the terminal authentication information peculiar to the key unit 100. The center server 400 that has received the terminal authentication information issuance request transmits the terminal authentication information peculiar to the key unit 100 mounted on the vehicle 10 to the user terminal 200. As a result, it is possible to perform an operation of unlocking the vehicle 10 on the user terminal 200. When the user terminal 200 does not have the terminal authentication information, the locking operation and the unlocking operation with respect to the vehicle 10 from the operation screen are not allowed.

In the present embodiment, the terminal authentication information acquired by the user terminal 200 may be a one-time key that is invalidated by using the locking of the cargo compartment door accompanying the completion of a collection/delivery work of the collection/delivery user as a trigger. For example, at the timing when the terminal authentication information transmitted from the center server 400 is received by the user terminal 200, the terminal authentication information is stored in a storage part (not shown) of the user terminal 200. Thereafter, the terminal authentication information is erased from the storage part at the timing when the user terminal 200 receives a locking notification transmitted from the key unit 100 at the time of performing the locking of the cargo compartment door accompanying the completion of the collection/delivery work.

The timing at which the terminal authentication information stored in the storage part of the user terminal 200 is erased is not limited to the aforementioned example, but may be a timing elapsed by a predetermined time from the time at which the user terminal 200 receives the terminal authentication information transmitted from the center server 400 (or the time at which the center server 400 has transmitted the terminal authentication information toward the user terminal 200). Further, the terminal authentication information is not limited to the one-time key described above, but may be a limited key that remains valid only in a predetermined time zone. Regardless of whether the terminal authentication information is a one-time key or a limited key, device authentication information corresponding to the terminal authentication information is stored in the key unit 100 in advance.

Next, the user terminal 50 of the requesting user will be described. Similar to the user terminal 200, the user terminal 50 may be a small computer, such as a smartphone, a mobile phone, a tablet terminal, a personal information terminal, a wearable computer (smart watch and the like) or the like, or may be a personal computer. The user terminal 50 of the requesting user includes a communication part 51, a controller 52, and an input/output part 53.

The communication part 51 is functionally equivalent to the communication part 202 and is communication means to be connected to the network N1. The controller 52 is a computer that controls the user terminal 50. The controller 52 is constituted by, for example, a microcomputer. By causing a CPU (not shown) to execute a program stored in storage means (ROM or the like), a function for performing various processes is realized. For example, the controller 52 executes the above-described prescribed application and requests collection and delivery of a collection/delivery parcel to the collection/delivery management server 500 of a predetermined delivery company via the input/output part 53. The input/output part 53 is means functionally similar to the above-described input/output part 204 and configured to accept an input operation performed by the requesting user and to present information to the requesting user.

In FIG. 2, the user terminal 50 does not explicitly have a configuration equivalent to the short-range communication part 201. However, the user terminal 50 may have such a configuration and may be configured so that, similar to the controller 203, the controller 52 performs a process of acquiring terminal authentication information from the center server 400 and transmits the terminal authentication information to the key unit 100 by short-range wireless communication so as to operate the locking and unlocking device 300 from the user terminal 50.

Next, the collection/delivery management server 500 will be described. The collection/delivery management server 500 has a general computer configuration. When a plurality of delivery companies participates in the trunk sharing system 1 as described above, each of the delivery companies prepares at least one collection/delivery management server as a management server thereof. The collection/delivery management server 500 is a computer that includes a processor (not shown), such as a central processing unit (CPU) or a digital signal processor (DSP), a main storage part (not shown), such as a random access memory (RAM) or a read only memory (ROM), and an auxiliary storage part (not shown), such as an erasable programmable ROM (EPROM), a hard disk drive (HDD), a removable medium or the like. The removable medium is, for example, a universal serial bus (USB) memory, or a disk recording medium, such as a compact disc (CD), a digital versatile disc (DVD) or the like. An operating system (OS), various programs, various tables and the like are stored in the auxiliary storage part. The programs stored in the auxiliary storage part are loaded and executed in a work area of the main storage part. Functions conforming to a predetermined purpose can be realized by controlling respective components through the execution of programs.

Further, the collection/delivery management server 500 includes a communication part 501. The communication part 501 is connected to another device and is configured to perform communication between the collection/delivery management server 500 and another device (for example, the center server 400, the user terminal 200 or the like). The communication part 501 is, for example, a local area network (LAN) interface board or a wireless communication circuit for wireless communication. The LAN interface board or the wireless communication circuit is connected to the network N1 that is a public communication network, such as the Internet.

The collection/delivery management server 500 further includes a collection/delivery management database (DB) 503 for storing the aforementioned collection/delivery information. The collection/delivery management DB 503 is formed by storing the collection/delivery information in the above-described auxiliary storage part. In the collection/delivery management DB 503, the requesting user and the collection/delivery information are linked to each other. The collection/delivery management DB 503 is constructed by managing the data stored in the auxiliary storage part with a program of a database management system (DBMS) executed by a processor. The collection/delivery management DB 503 is, for example, a relational database.

The configuration of the collection/delivery information stored in the collection/delivery management DB 503 will be described with reference to FIG. 3. FIG. exemplifies a table configuration of collection/delivery information. The collection/delivery information table includes fields of a requesting user ID, a collection/delivery category, a collection/delivery date and time, a collection/delivery location, a collection/delivery status, a parcel attribute, and an access permission condition. Identification information for specifying the requesting user is input into the requesting user ID field. Information for specifying whether to deliver or collect a collection/delivery parcel by the collection/delivery user is input into the collection/delivery category field. Information indicating the date and time at which a collection/delivery parcel is to be collected or delivered is input into the collection/delivery date and time field. In particular, with regard to collection/delivery time, a specific time may be input, or a specific time zone at which the collection or delivery is required may be input. Information indicating whether the collection and delivery of a collection/delivery parcel by the collection/delivery user has been completed is input into the collection/delivery status field. For example, "completed" is input when the collection or delivery of a collection/delivery parcel has been completed, and "not completed" is input when the collection or delivery has not been completed. Attribute information such as weight, size or the like concerning a collection/delivery parcel is input into the parcel attribute field. Information on an access permission condition to be described later is input into the access permission condition field.

In the collection/delivery management server 500, a controller 502 as a functional part is formed by executing a program with the above-described processor. The controller 502 performs management control such as registration and update of collection/delivery information in the collection/delivery management DB 503. For example, when the requesting user requests collection and delivery of a collection/delivery parcel via the user terminal 50, the collection/delivery date and time, the collection/delivery location and the like are linked to the identification information of the requesting user, thereby generating collection/delivery information corresponding to the requesting user and storing collection/delivery information in the collection/delivery management DB 503. If a notification of a change of information on the collection/delivery date and time or the collection/delivery location is input from the requesting user after generation of the collection/delivery information, the stored collection/delivery information is updated according to the change. In addition, the controller 502 communicates with the user terminal 200 of the collection/delivery user via the communication part 501 and also updates the information on the status of a collection/delivery parcel included in the collection/delivery information. For example, the controller 502 receives the status information (for example, information indicating the completion of collection/delivery) input by the collection/delivery user via the input/output part 204 from the user terminal 200 and updates the corresponding collection/delivery information.

Figure 7:
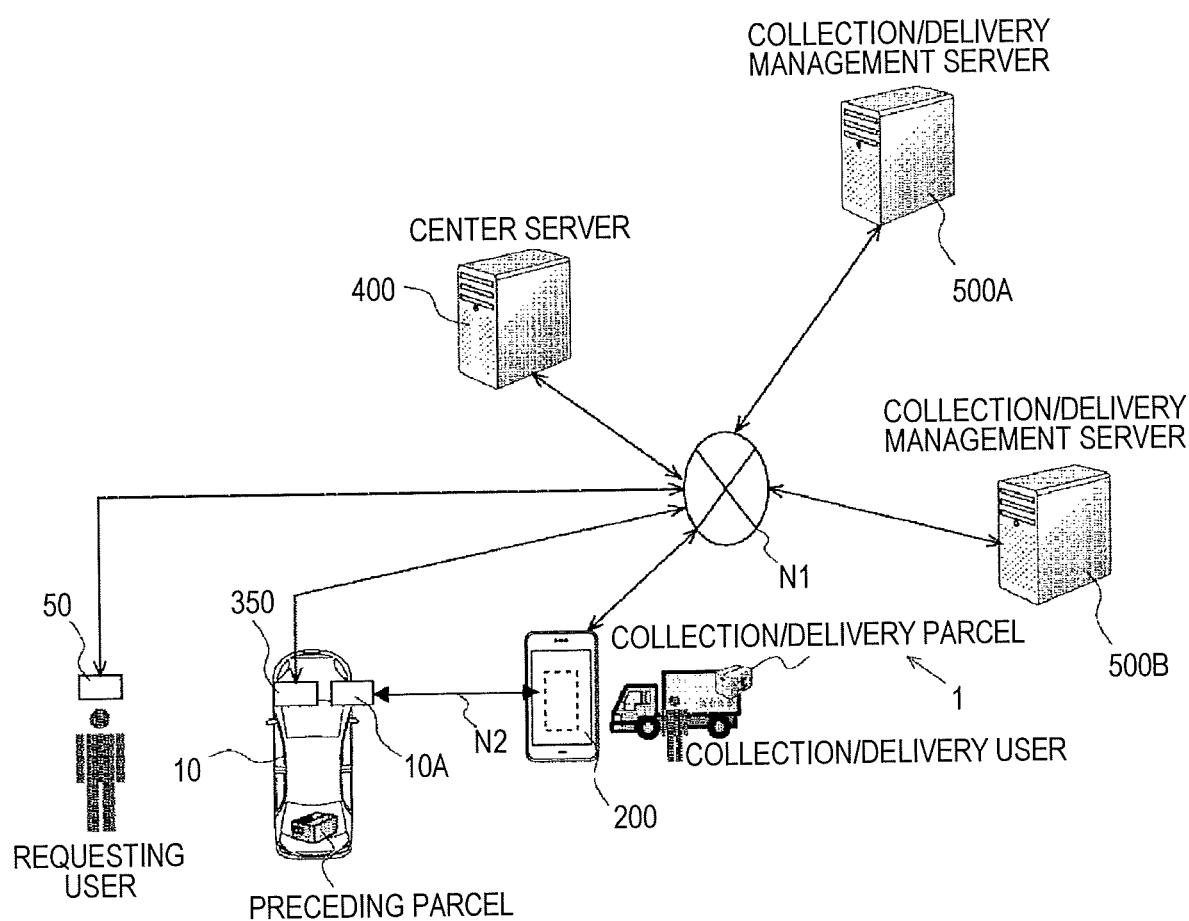
FIG. 7 is a diagram showing a schematic configuration of a trunk sharing system including a control system according to a second embodiment of the disclosure.
Figure 8:
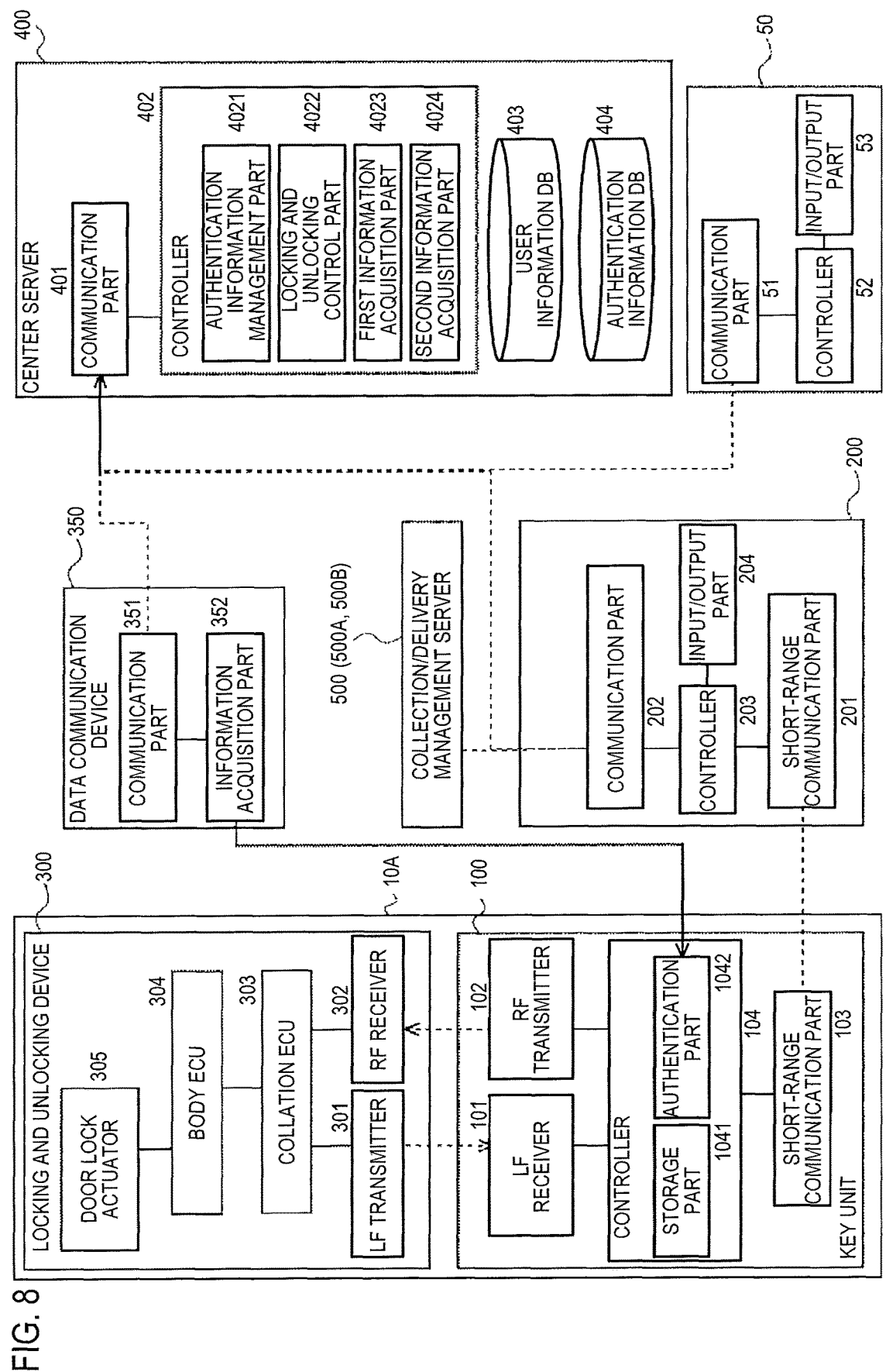
FIG. 8 is a diagram showing detailed configurations of an in-vehicle device, a user terminal, a center server, and a collection/delivery management server, that constitute the trunk sharing system shown in FIG. 7.

In addition, vehicle management information in which the requesting user is linked to the vehicle 10 as a corresponding collection/delivery location is also stored in the collection/delivery management DB 503. Configuration of the vehicle management information will be described with reference to FIG. 4. FIG. 4 shows a table configuration of the vehicle management information. The vehicle management information table includes not only a requesting user ID field, but also a vehicle type field, a color field, and a number field into which information (vehicle type, vehicle color and vehicle number) for identifying the vehicle 10 is input so that the collection/delivery user can discover the vehicle 10 when the requesting user selects the vehicle 10 as a collection/delivery location. Furthermore, the vehicle management information table further includes a vehicle position field into which position information on a location of the vehicle 10 is input. The position information of the vehicle 10 may be acquired by an input from the requesting user via the user terminal 50. Alternatively, the position information of the vehicle 10 may be grasped by the center server 400 via a data communication device 350 provided in the vehicle 10 as shown in FIGS. 7 and 8 to be described later and acquired from the center server 400.

The controller 502 transmits a collection/delivery instruction to the user terminal 200 so that the collection/delivery user can collect and deliver the collection/delivery parcel to the vehicle 10 based on the collection/delivery information and the vehicle management information linked to the requesting user. This collection/delivery instruction may be sent to the user terminal 200 a plurality of times rather than once. For example, on the day before the scheduled collection/delivery date, the collection/delivery instructions related to the collection and delivery of the next day may be collectively transmitted to the user terminal 200 of the collection/delivery user, and the collection/delivery instruction may be transmitted again on the day of collection and delivery. In addition, when there is an update in the collection/delivery information, the update contents are reflected at the time of the retransmission.

Any one of the respective functional components of the collection/delivery management server 500 or a part of the processes thereof may be executed by another computer connected to the network N1. In addition, the series of processes executed by the collection/delivery management server 500 may be executed by hardware, or may be executed by software.

Next, the center server 400 will be described. The center server 400 also has a general computer configuration. Basic hardware configuration of the center server 400 is the same as that of the collection/delivery management server 500. The center server 400 includes a processor, a main storage part, and an auxiliary storage part that are not shown. Therefore, by loading a program stored in the auxiliary storage part into a work area of the main storage part and executing the loaded program, and by controlling respective components through the execution of the program, it is possible to realize a function conforming to a predetermined purpose. The center server 400 also includes a communication part 401. The communication part 401 is functionally equivalent to the communication part 501 of the collection/delivery management server 500 and is configured to perform communication between the center server 400 and other devices (for example, the collection/delivery management server 500 and the like).

The center server 400 further includes a user information DB 403 and an authentication information DB 404 provided in the auxiliary storage part to store various kinds of information. These databases (DB) are constructed by a program of a database management system that is executed by a processor and manages the data stored in the auxiliary storage part. The user information DB 403 and the authentication information DB 404 are, for example, relational databases.

The user information DB 403 stores identification information of the user who uses the vehicle 10 (for example, the collection/delivery user who delivers a collection/delivery parcel to the vehicle 10 or the requesting user who collects the delivered collection/delivery parcel), a corresponding password, and the like.

The authentication information DB 404 stores authentication information of the vehicle 10 corresponding to the terminal authentication information described above. The authentication information of the vehicle 10 is information associated with identification information (key ID) of the vehicle 10 and may be, for example, identification information peculiar to the key unit 100 of the in-vehicle device 10A. In addition to the authentication information of the vehicle 10, the authentication information DB 404 may further store information on a valid period (including an effective time zone) of the authentication information, invalidation or validation of the authentication information, and the like. The valid period of the authentication information may be transmitted to the user terminal 200 of the collection/delivery user together with the authentication information. Upon receiving the valid period of the authentication information, the user terminal 200 of the collection/delivery user may delete and invalidate the authentication information having a valid period already passed. In addition, the invalidation or validation of the authentication information indicates a state as to whether the authentication information is transmitted to the user terminal 200 and kept in a valid state or whether the authentication information is invalidated due to the expiration of the valid period. When the authentication information is transmitted to the user terminal 200 and is kept in a valid state, an authentication information management part 4021 described later prevents the authentication information from being issued with an overlapping valid period. This makes it possible to avoid duplicate issuance of the authentication information.

In the center server 400, a controller 402 is formed as a functional part by executing a program with the above-described processor. The controller 402 performs control related to the issuance of authentication information to the user terminal 200 or the like. More specifically, the controller 402 includes, as functional parts, the authentication information management part 4021, a locking and unlocking control part 4022, a first information acquisition part 4023, and a second information acquisition part 4024.

The authentication information management part 4021 manages the issuance of authentication information for locking and unlocking the vehicle 10. Specifically, the authentication information management part 4021 receives a request for issuance of authentication information for locking and unlocking the vehicle 10 from the user terminal 200 of the collection/delivery user via the collection/delivery management server 500. The authentication information management part 4021 receives the information of the user terminal 200 that is an issuance destination of the authentication information, together with the request for issuance of authentication information. The authentication information management part 4021 transmits the authentication information (terminal authentication information) corresponding to the key unit 100 to the user terminal 200 via the collection/delivery management server 500. The authentication information management part 4021 may generate authentication information including valid period information. Even when the key unit 100 of the in-vehicle device 10A receives the authentication information including the validity period information, if the valid period has elapsed, the key unit 100 assumes that the authentication information has been invalidated and does not execute the locking and unlocking of the vehicle 10.

In order to prevent the collection/delivery user from further delivering a collection/delivery parcel to the cargo compartment in a state in which a parcel is already placed in the cargo compartment of the vehicle 10, the locking and unlocking control part 4022 executes a predetermined process relating to the authentication information issued by the authentication information management part 4021. The parcel that has already been placed in the cargo compartment will be hereinafter referred to as "preceding parcel." The preceding parcel is a parcel placed in the cargo compartment of the vehicle 10 by a user different from the collection/delivery user A who intends to deliver a collection/delivery parcel (the collection/delivery user belonging to the delivery company managing the collection/delivery management server 500A). The user different from the collection/delivery user A is, for example, a collection/delivery user B belonging to another delivery company when the requesting user requests delivery to another delivery company (for example, the delivery company managing the collection/delivery management server 500B). The requesting user scheduled to access and collect the preceding parcel may correspond to a first user. The correlation between the requesting user and the preceding parcel is the "correlated" relationship of the disclosure. The collection/delivery user A who delivers a collection/delivery parcel may correspond to a second user.

If a locking and unlocking process of the cargo compartment of the vehicle 10 is performed in order for another collection/delivery user A to deliver a collection/delivery parcel to the cargo compartment in a state in which the preceding parcel to be collected by the requesting user is present in the cargo compartment of the vehicle 10, the collection/delivery user A may access the preceding parcel. From the position of the requesting user or the collection/delivery user B who has delivered the preceding parcel, this cannot be said to be a favorable state in terms of security of the preceding parcel. Thus, if the preceding parcel is present in the cargo compartment and if the cargo compartment is locked, the locking and unlocking control part 4022 performs the aforementioned predetermined process so that the unlocking of the cargo compartment of the vehicle 10 by the collection/delivery user A is not permitted in order to keep the security of the preceding parcel.

In the present embodiment, as the predetermined process, the locking and unlocking control part 4022 performs a process that causes the authentication information management part 4021 not to issue the authentication information to the user terminal 200 of the collection/delivery user A. That is to say, even when a request for issuance of authentication information is transmitted from the user terminal 200 of the collection/delivery user A to the center server 400 via the collection/delivery management server 500A, if the preceding parcel is present in the cargo compartment of the vehicle 10 and if the cargo compartment is locked, the locking and unlocking control part 4022 does not permit the issuance of authentication information by the authentication information management part 4021. When the authentication information is not issued as described above, it is preferable that the locking and unlocking control part 4022 notifies the user terminal 200 of the collection/delivery user A to that effect.

The first information acquisition part 4023 acquires presence information concerning whether a parcel is present in the cargo compartment of the vehicle 10. For example, if the preceding parcel is delivered to the vehicle 10 by the collection/delivery user B and if the cargo compartment is locked, a notification that the delivery of the preceding parcel has been completed is transmitted from the user terminal 200 of the collection/delivery user B to the collection/delivery management server 500B. As a result, in the collection/delivery management server 500B, the controller 502 updates the collection/delivery status of the collection/delivery information related to the preceding parcel, that is stored in the collection/delivery management DB 503. Thereafter, if the unlocking of the cargo compartment of the vehicle 10 is not performed by the requesting user, the first information acquisition part 4023 acquires presence information indicating that the preceding parcel is present in the cargo compartment. If the unlocking is performed, the first information acquisition part 4023 acquires presence information indicating that the preceding parcel does not exist in the cargo compartment. The locking/unlocking state of the cargo compartment of the vehicle 10 can be grasped by the center server 400 (the first information acquisition part 4023) via the data communication device 350 to be described later. Alternatively, a camera for imaging the inside of the cargo compartment of the vehicle 10 may be installed, and the presence or absence of the preceding parcel in the cargo compartment may be determined based on the captured image content, and may be reflected on the presence information. Moreover, the presence or absence of the preceding parcel may be determined based on a detection value of a weight sensor provided in the cargo compartment of the vehicle 10, and may be reflected on the presence information.

Even when the preceding parcel is present in the cargo compartment of the vehicle 10, the second information acquisition part 4024 acquires information on the preceding-parcel-related access permission condition for allowing a user other than the user related to the preceding parcel to access the cargo compartment, i.e., for permitting the locking and unlocking of the cargo compartment (see FIG. 3). When the input value of the access permission condition field in the collection/delivery information table is "not permitted", it means that the access to the cargo compartment is not permitted if the preceding parcel is present. When the input value is "permitted", it means that the access to the cargo compartment is permitted even if the preceding parcel is present. In the embodiment shown in FIG. 3, the access permission condition is set for each parcel collected and delivered by the collection/delivery user. Alternatively, the access permission condition may be uniformly set for all kinds of parcels present in the cargo compartment of the vehicle 10. In this case, the information on the access permission condition is preferably not included in the collection/delivery information table shown in FIG. 3, but is included in the vehicle management information table shown in FIG. 4. The information on the access permission condition is input from the user terminal 50 when the requesting user requests delivery of a parcel, and is included in the collection/delivery information or the vehicle management information of the collection/delivery management DB 503. Then, by accessing the collection/delivery management DB 503, the second information acquisition part 4024 can acquire information on the access permission condition.

Any one of the respective functional components of the center server 400 or a part of the processes thereof may be executed by another computer connected to the network N1. In addition, the series of processes executed by the center server 400 may be executed by hardware, or may be executed by software.

<Process Flow>

Figure 5:
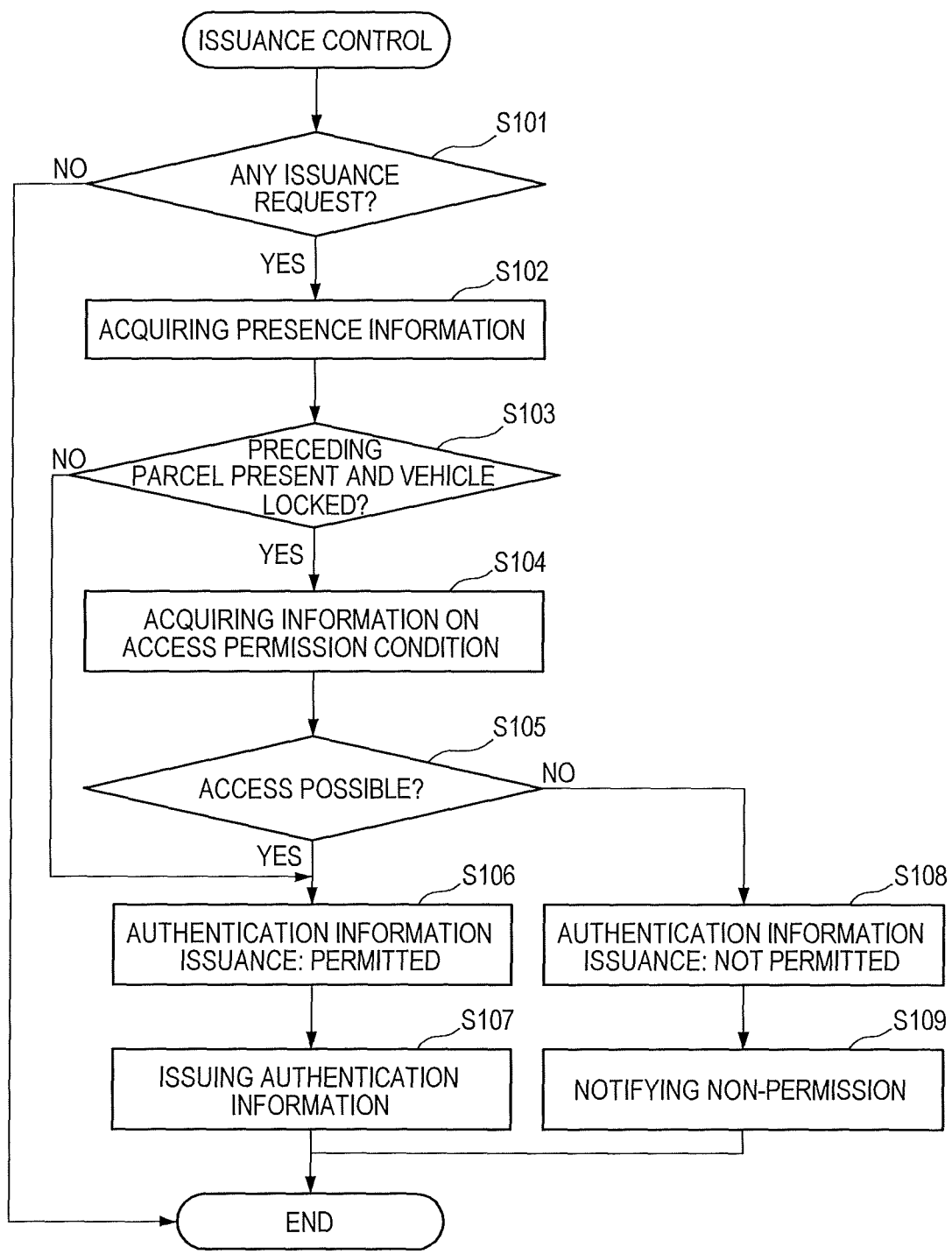
FIG. 5 is a flowchart of issuance control executed by the center server according to the first embodiment of the disclosure.

FIG. 5 is a flow of an issuance control of authentication information repeatedly executed at predetermined intervals in the center server 400. In the following description, when explaining a flow of the issuance control or a process in the trunk sharing system, it is assumed that the preceding parcel is delivered by the collection/delivery user B as an example. This is not meant to limit the preceding parcel to the delivered parcel. The issuance control controls the issuance of authentication information based on the presence or absence of the preceding parcel in the cargo compartment of the vehicle 10. First, in step S101, the controller 402 determines whether or not there is a request for issuance of authentication information from the user terminal 200 of the collection/delivery user. When an affirmative determination is made in step S101, the process proceeds to step S102. When a negative determination is made in step S101, the issuance control is ended. When an issuance request is made, the controller 402 of the center server 400 specifies the user terminal 200 as an issuance request source and the vehicle 10 as an object of the locking and unlocking process, based on the information included in the issuance request.

In step S102, the first information acquisition part 4023 acquires the presence information on the vehicle 10. Then, in step S103, based on the obtained presence information, the controller 402 determines whether a preceding parcel is present in the cargo compartment of the vehicle 10 and whether the vehicle 10 is in a locked state. The locking/unlocking state of the cargo compartment of the vehicle 10 can be grasped by the first information acquisition part 4023 via the data communication device 350 to be described later. If an affirmative determination is made in step S103, the process proceeds to step S104. If a negative determination is made, the process proceeds to step S106.

If the affirmative determination is made in step S103, the process proceeds to step S104. In step S104, the second information acquisition part 4024 accesses the collection/delivery information table shown in FIG. 3 to acquire information on an access permission condition with respect to the parcel present as the preceding parcel in the cargo compartment of the vehicle 10, namely, to grasp whether the input value of the access permission condition field is set to "permitted" or "not permitted". Furthermore, as described above, when the access permission condition is alternatively included in the vehicle management information table shown in FIG. 4, the second information acquisition part 4024 accesses the vehicle management information table to acquire information on the access permission condition. Based on the acquired access permission condition, in step S105, the controller 402 determines whether the collection/delivery user can access the cargo compartment even if the preceding parcel is present in the cargo compartment of the vehicle 10 and the cargo compartment is in a locked state. Specifically, when the information on the access permission condition is included in the collection/delivery information as shown in FIG. 3, if the access permission condition is set to "permitted" for all of one or more preceding parcels present in the cargo compartment, "access is possible," namely, an affirmative determination is made in step S105. The process proceeds to step S106. On the other hand, if one or more preceding parcels existing in the cargo compartment contain at least one preceding parcel having an access permission condition set to "not permitted," "access is impossible", namely, a negative determination is made in step S105. The process proceeds to step S108. When the information on the access permission condition is included in the vehicle management information shown in FIG. 4, the access permission condition is treated so as to be uniformly applied to one or more parcels present in the cargo compartment of the vehicle 10. Thus, if the access permission condition is set to "permitted," an affirmative determination is made in step S105. If the access permission condition is set to "not permitted," a negative determination is made in step S105.

The process proceeds to step S106 as a result of the negative determination made in step S103 or the affirmative determination made in step S105. In step S106, the locking and unlocking control part 4022 permits issuance of authentication information by the authentication information management part 4021. Then, in step S107, the authentication information management part 4021 issues authentication information. On the other hand, the process proceeds to step S108 as a result of the negative determination made in step S105. In S108, the locking and unlocking control part 4022 does not permit the authentication information management part 4021 to issue authentication information. As a result, in step S109, the fact that the issuance of authentication information is not permitted is notified to the user terminal 200 that has made the request for issuance of authentication information.

Figure 6:
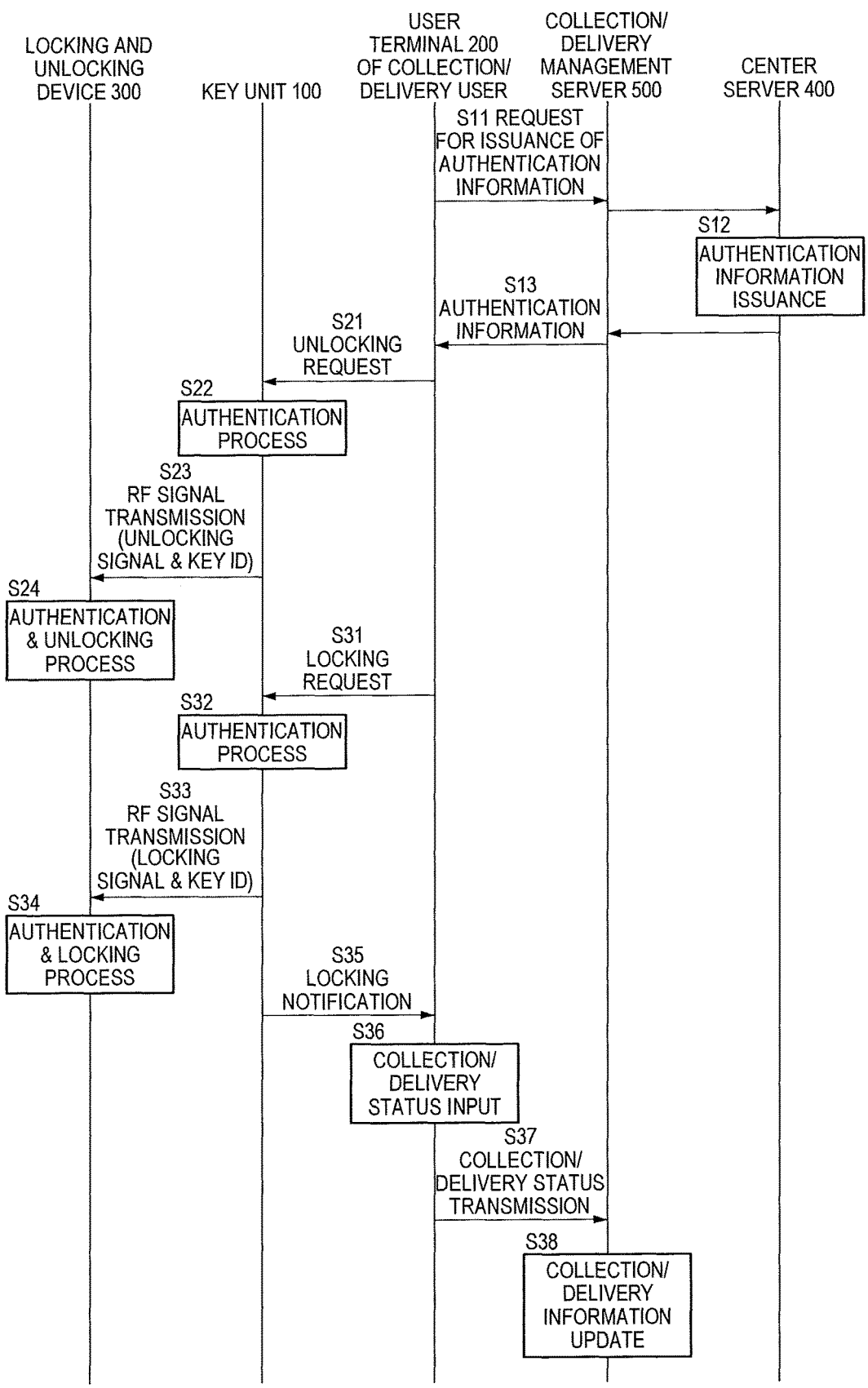
FIG. 6 is a diagram showing a flow of processing in the trunk sharing system.

Next, an operation of the trunk share system 1 when authentication information is issued to the user terminal 200 by the center server 400 in which issuance control of authentication information is performed as described above will be described with reference to FIG. 6. In the flow shown in FIG. 6, in order to deliver the parcel in accordance with the collection and delivery request from the requesting user, when the collection/delivery user reaches the vicinity of the vehicle 10, the processing of step S11 is performed. That is to say, a request for issuance of authentication information is made from the user terminal 200 to the center server 400 via the collection/delivery management server 500. Then, it is assumed that authentication information for the user terminal 200 has been issued through the issuance control shown in FIG. 5 (the processing of step S12).

Then, in step S13, the issued authentication information is transmitted to the user terminal 200 via the collection/delivery management server 500. When the user terminal 200 receives the authentication information transmitted from the center server 400 in this way, it becomes possible for the user terminal 200 to lock and unlock the cargo compartment of the vehicle 10.

Next, in steps S21 to S24, a process for unlocking the cargo compartment of the vehicle 10 is performed using the user terminal 200. It is assumed that when the processing in steps S21 to S24 is performed, the user terminal 200 has been moved by the collection/delivery user to a position where the short-range wireless communication between the key unit 100 of the vehicle 10 and the user terminal 200 is established.

When the collection/delivery user performs an operation to unlock the vehicle 10 via the input/output part 204 of the user terminal 200, in step S21, the user terminal 200 transmits an unlocking request including authentication information to the key unit 100. Then, when the unlocking request transmitted from the user terminal 200 is received by the key unit 100, in step S22, the key unit 100 compares the authentication information (terminal authentication information) included in the unlocking request with the authentication information (device authentication information) stored in the storage part 1041, thereby performing an authentication process. Upon successful authentication of the two kinds of authentication information, in step S23, the key unit 100 transmits an unlocking signal and a key ID to the locking and unlocking device 300. When the unlocking signal and the key ID transmitted from the key unit 100 are received by the locking and unlocking device 300, in step S24, the locking and unlocking device 300 performs an authentication process based on the received key ID. As a result, when the authentication is successful, the cargo compartment of the vehicle 10 is unlocked. At this time, the locking and unlocking device 300 may perform an answer-back or the like to the key unit 100.

In steps S31 to S38, a process for locking the vehicle 10 using the user terminal 200 and a process related to the locking are performed. When the collection/delivery user closes the cargo compartment door by the unlocking process and performs an operation to lock the vehicle 10 via the input/output part 204 of the user terminal 200 after conducting a predetermined delivery work, in step S31, the user terminal 200 transmits a locking request including authentication information to the key unit 100. When the locking request transmitted from the user terminal 200 is received by the key unit 100, in step S32, the key unit 100 compares the authentication information (terminal authentication information) included in the locking request transmitted from the user terminal 200 with the authentication information (device authentication information) stored in the storage part 1041, thereby performing an authentication process. Upon successful authentication of the two kinds of authentication information, in step S33, the key unit 100 transmits a locking signal and a key ID to the locking and unlocking device 300. When the locking signal and the key ID transmitted from the key unit 100 are received by the locking and unlocking device 300, in step S34, the locking and unlocking device 300 performs an authentication process based on the received key ID. As a result, when the authentication is successful, the cargo compartment door of the vehicle 10 is locked. After transmitting the locking signal to the locking and unlocking device 300, the key unit 100 transmits a notification (locking notification) to the user terminal 200 that the locking is completed (the processing of step S35). Thus, a notification that the locking is completed is output on the touch panel screen of the user terminal 200.

Upon confirming from the locking notification that the collection/delivery user has completed the delivery of the parcel, the collection/delivery user inputs the latest collection/delivery status, i.e., the status indicating that the collection/delivery has been completed, in order to update the collection/delivery status in the collection/delivery information stored in the collection/delivery management server 500 via the input/output part 204 of the user terminal 200. Thus, the latest collection/delivery status is transmitted from the user terminal 200 to the collection/delivery management server 500 (the processing of step S37). As a result, in the collection/delivery management server 500 that has received the latest collection/delivery status, the controller 502 updates the collection/delivery information (the processing of step S38). As for the update of the collection/delivery status, instead of inputting the information for the update by the collection/delivery user, when the user terminal 200 receives the locking notification from the key unit 100 in the processing of step S35, the user terminal 200 may subsequently issue an update command to the collection/delivery management server 500 so that the collection/delivery status becomes collection/delivery completion, without an input by the collection/delivery user. If the authentication information used by the user terminal 200 in this collection/delivery operation is a one-time key, the authentication information acquired in step S13 may be invalidated at the timing when the user terminal 200 receives the locking notification in the processing of step S35. That is to say, the authentication information stored in the storage part of the user terminal 200 may be erased from the user terminal 200 at the timing when the user terminal 200 receives the locking notification.

According to the center server 400 described above, if the cargo compartment is locked in a state in which a preceding parcel is present in the cargo compartment of the vehicle 10, the collection/delivery user cannot unlock the cargo compartment to deliver a collection/delivery parcel, as long as the access to the cargo compartment is not permitted based on the access permission condition. Thus, the security associated with the preceding parcel can be maintained at a high level. In the case where the preceding parcel is a parcel that does not require a high level of security from the position of the requesting user, the requesting user may set the access permission condition for the preceding parcel to "permitted." Thus, even in a state in which the preceding parcel is present in the cargo compartment of the vehicle 10, it is possible for the collection/delivery user to lock and unlock the cargo compartment in order to deliver the collection/delivery parcel. This makes it possible to ensure smooth delivery of a parcel.

In the above embodiment, the information on the access permission condition is set. However, from the viewpoint of keeping the security of the preceding parcel high, it is not always necessary to determine whether to issue authentication information based on the access permission condition. That is to say, the center server 400 does not necessarily have to include the second information acquisition part 4024. As a result, the processing of steps S104 and S105 are not necessarily performed in the issuance control shown in FIG. 5. In this case, if a negative determination is made in step S103, the process may proceed to step S106, and if an affirmative determination is made in step S103, the process may proceed to step S108.

Second Embodiment

FIG. 7 is a view showing a schematic configuration of the trunk sharing system 1 according to the present embodiment. The difference between the trunk sharing system 1 shown in FIG. 1 and the trunk sharing system 1 shown in FIG. 7 is whether or not the data communication device 350 is included in the system. Components substantially common in both trunk sharing systems are denoted by the same reference numerals with detailed description thereof omitted. FIG. 8 is a block diagram schematically showing an example of each component of the trunk sharing system 1 according to the present embodiment.

The data communication device 350, which is a device mounted on the vehicle 10, has a configuration of a computer that includes a processor (not shown), such as a central processing unit (CPU) or a digital signal processor (DSP), a main storage part (not shown), such as a random access memory (RAM) or a read only memory (ROM), and an auxiliary storage part (not shown), such as an erasable programmable ROM (EPROM), a hard disk drive (HDD), a removable medium or the like. The removable medium is the same as described in the first embodiment. An operating system (OS), various programs, various tables and the like are stored in the auxiliary storage part. The programs stored in the auxiliary storage part are loaded and executed in a work area of the main storage part. Functions conforming to a predetermined purpose can be realized by controlling the respective components and the like through the execution of programs.

The data communication device 350 includes a communication part 351. The communication part 351 performs communication with the center server 400. The communication part 351 is, for example, a wireless communication circuit for wireless communication. The wireless communication circuit is connected to the network N1 that is a public communication network, such as the Internet.

In the data communication device 350, an information acquisition part 352 is formed as a functional part by executing a program with the above-described processor. For example, the information acquisition part 352 acquires information (hereinafter referred to as "authentication process related information") related to the authentication process in the key unit 100 from the center server 400 via the communication part 351 and delivers the authentication process related information to the controller 104 of the key unit 100. In order to deliver the authentication process related information, the data communication device 350 and the key unit 100 are electrically connected via a CAN or the like. Furthermore, the information acquisition part 352 may acquire not only the authentication process related information but also various kinds of information usable in the vehicle 10 from the center server 400 via the communication part 351. In addition, the information acquisition part 352 may acquire various kinds of information detected by a sensor (not shown) or the like in the vehicle 10 and may deliver the information to the center server 400 via the communication part 351.

Figure 9:
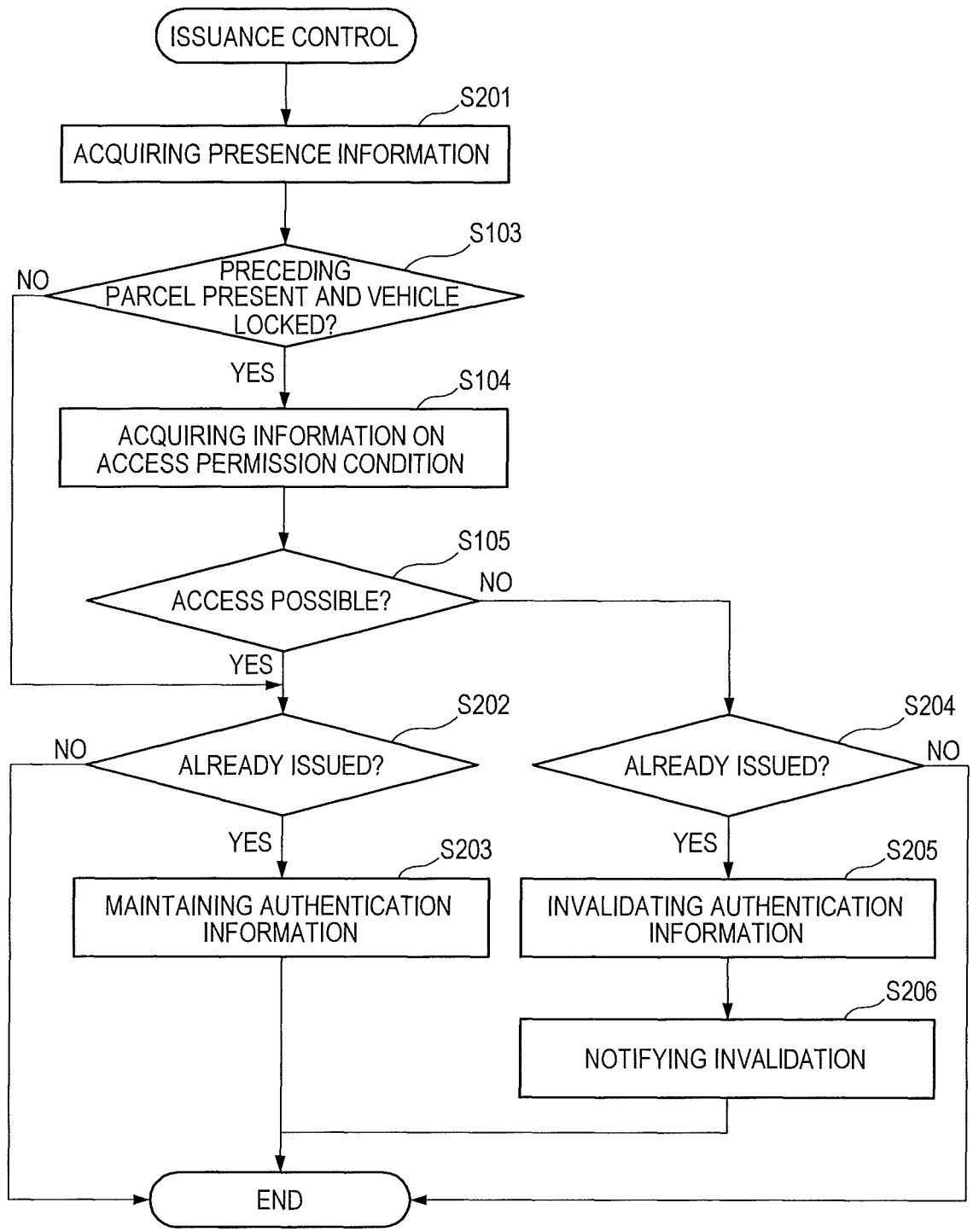
FIG. 9 is a flowchart of issuance control executed by the center server according to the second embodiment of the disclosure.

FIG. 9 shows a flow of issuance control of authentication information executed by the center server 400 in the present embodiment. In the issuance control, the validity or invalidity of the authentication information already issued to the user terminal 200 (for example, the authentication information issued in the processing of steps S11 to S13 shown in FIG. 6) is controlled based on the presence or absence of a preceding parcel in the cargo compartment of the vehicle 10. That is to say, in the present embodiment, the locking and unlocking control part 4022 performs an invalidation process of the already issued authentication information as the predetermined process described above. Even when the authentication information has already been issued from the center server 400 to the user terminal 200 of the collection/delivery user A via the collection/delivery management server 500A, if a preceding parcel is present in the cargo compartment of the vehicle 10 and the cargo compartment is locked at the time at which the collection/delivery user A approaches the vehicle 10, the locking and unlocking control part 4022 invalidates the issued authentication information. In the issuance control shown in FIG. 9, processes that are substantially the same as those included in the issuance control shown in FIG. 5, are denoted by the same reference numerals with a detailed description thereof omitted.

The issuance control shown in FIG. 9 is repeatedly executed at predetermined intervals in the center server 400. Alternatively, when the collection/delivery user stands at a position where the collection/delivery user can lock and unlock the vehicle 10 using the already issued authentication information, the user terminal 200 may issue a command to the center server 400 so as to execute the issuance control. As a prerequisite for this control, it is assumed that, apart from this control, the authentication information of the user terminal 200 is issued as the processing of steps S11 to S13 is performed by the authentication information management part 4021 in response to the issuance request from the user terminal 200.

Details of the issuance control of the present embodiment will be described below. First, in step S201, similar to step S102, the presence information on the vehicle 10 is acquired by the first information acquisition part 4023. It is preferable that the presence information is information available immediately before the issuance control is executed. After the processing of step S201, the processing of steps S103 to S105 is performed. Then, when a negative determination is made in step S103 or an affirmative determination is made in step S105, the process proceeds to step S202. On the other hand, if a negative determination is made in step S105, the process proceeds to step S204.

In step S202, the locking and unlocking control part 4022 determines whether the authentication information of the vehicle 10 has already been issued to the user terminal 200 by the authentication information management part 4021. If an affirmative determination is made in step S202, the process proceeds to step S203. If a negative determination is made, this control comes to an end. Then, in step S203, the authentication information already issued by the authentication information management part 4021 is maintained in a valid state by the locking and unlocking control part 4022, and this control is ended. That is to say, the locking and unlocking control part 4022 does not perform a specific process on the key unit 100 via the user terminal 200 or the data communication device 350.

On the other hand, in step S204 proceeded from step S105 where a negative determination is made, just like step S202, the locking and unlocking control part 4022 determines whether the authentication information of the vehicle 10 has already been issued to the user terminal 200 by the authentication information management part 4021. If an affirmative determination is made in step S204, the process proceeds to step S205. If a negative determination is made, this control comes to an end.

Then, in step S205, the locking and unlocking control part 4022 performs an invalidation process of the authentication information already issued by the authentication information management part 4021. The contents of the invalidation process are not limited to a specific one, as long as the invalidation process makes it impossible for the collection/delivery user to lock and unlock the vehicle 10 with the already issued authentication information. Examples of the invalidation process are shown below.

(1) The center server 400 instructs the user terminal 200 to delete the authentication information.
(2) The center server 400 instructs the user terminal 200 to set an invalid flag of authentication information. In this case, the controller 203 needs to be configured not to transmit the authentication information having the invalid flag to the vehicle 10 via short-range wireless communication.
(3) The center server 400 instructs the user terminal 200 to rewrite the expiration date included in the authentication information to the past date and time.
(4) The center server 400 instructs the user terminal 200 not to transmit the authentication information, that is invalid, to the vehicle 10.
(5) The center server 400 instructs the key unit 100 not to accept the authentication information, that is invalid, via the data communication device 350. This command corresponds to the authentication process related information.
(6) The center server 400 instructs the key unit 100 not to accept the authentication information from the user terminal 200. This command corresponds to the authentication process related information.

The invalidation processes shown in the above items (1) to (4) are processes performed from the center server 400 to the user terminal 200, and the invalidation processes shown in the above items (5) to (6) are processes performed from the center server 400 to the key unit 100. The invalidation process may be either one of the process performed on the user terminal 200 and the process performed on the key unit 100. However, it cannot be said that the communication between the user terminal 200 and the center server 400 and the communication between the data communication device 350 and the center server 400 are always in a good state. Therefore, it is preferable that the invalidation processes are both the process performed on the user terminal 200 and the process performed on the key unit 100.

After the above invalidation process is performed in step S205, in step S206, a notification of invalidation is transmitted to the user terminal 200 having authentication information already invalidated.

According to the center server 400 of the present embodiment, if the cargo compartment is locked in a state in which a preceding parcel is present in the cargo compartment of the vehicle 10, the authentication information already issued to the collection/delivery user is invalidated as long as the access to the cargo compartment is not permitted based on the access permission condition. Thus, it is not possible to lock and unlock the cargo compartment to deliver a collection/delivery parcel. As a result, the security associated with the preceding parcel can be maintained at a high level. Also in this embodiment, from the viewpoint of maintaining high security of the preceding parcel, the invalidation process of the authentication information based on the access permission condition, i.e., the processing of steps S104 and S105, may be omitted.

Third Embodiment

Figure 10:
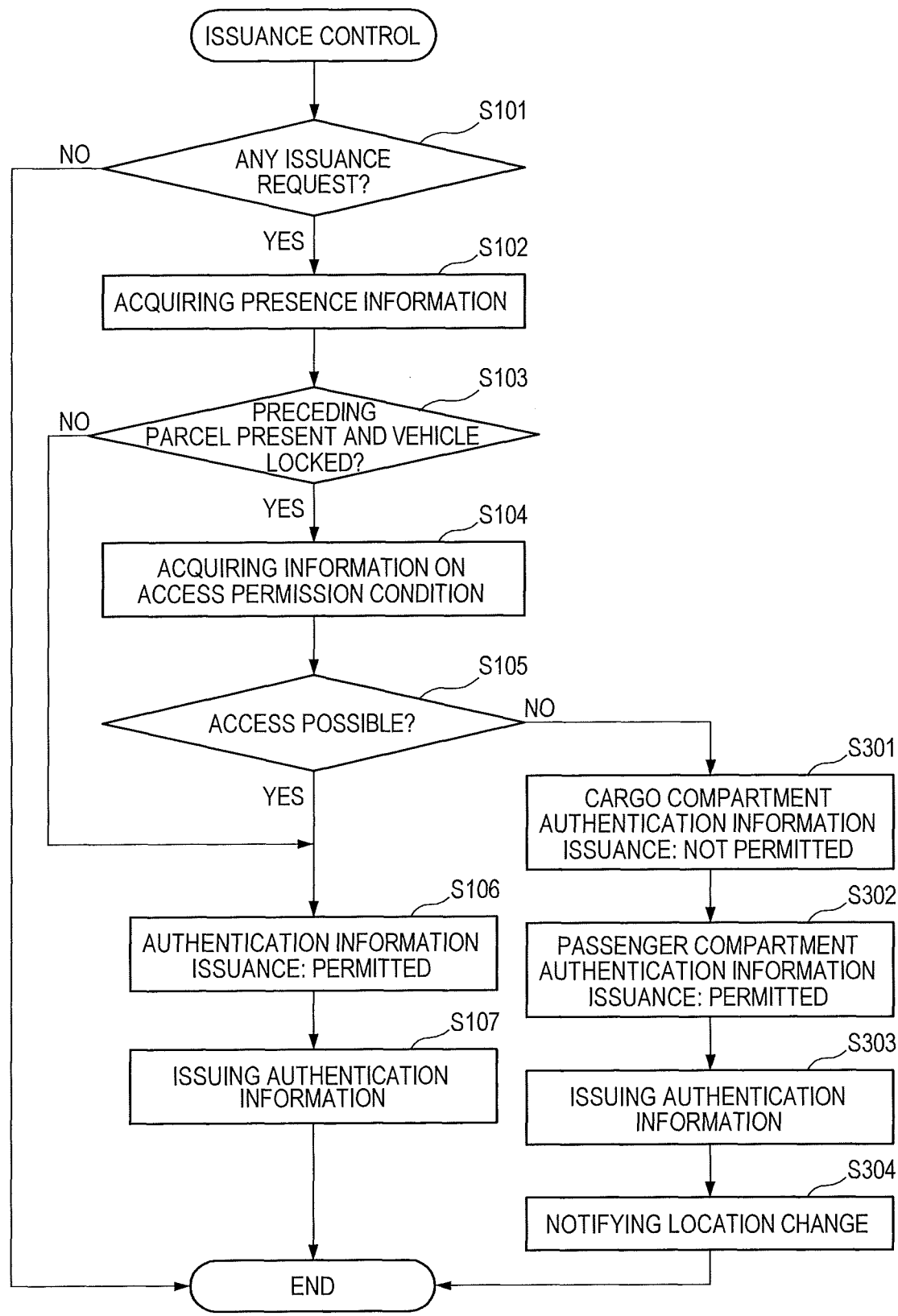
FIG. 10 is a flowchart of issuance control executed by a center server according to a third embodiment of the disclosure.

A third embodiment will be described with reference to FIG. 10. FIG. 10 is a flowchart of issuance control of authentication information executed by the center server 400 in the present embodiment. The issuance control is triggered by a request for issuance of authentication information from the user terminal 200 of the collection/delivery user to control issuance of authentication information based on the presence or absence of a preceding parcel in the cargo compartment of the vehicle 10. In the issuance control shown in FIG. 10, processes that are substantially the same as those included in the issuance control shown in FIG. 5, are denoted by the same reference numerals with a detailed description thereof omitted.

Further, in the present embodiment, it is assumed that the vehicle 10 has an alternative space that is formed independently of the cargo compartment to accommodate a delivered parcel and is capable of being locked and unlocked by the locking and unlocking device 300. Specifically, the alternative space may be the passenger compartment of the vehicle 10. In this case, a locking and unlocking request including authentication information is transmitted from the user terminal 200 to the key unit 100 (see the processing of steps S21 and S31 in FIG. 6). At this time, the locking/unlocking request may include information (hereinafter referred to as "locking/unlocking location information") regarding which of the space of the vehicle 10 is to be locked and unlocked. Example of the locking/unlocking location information may include information indicating one of a locking/unlocking request of only a cargo compartment, a locking/unlocking request of only a passenger compartment, and a locking/unlocking request of both compartments. Upon receiving the locking/unlocking request, the key unit 100 also transmits the locking/unlocking location information when transmitting the locking/unlocking signal and the key ID to the locking and unlocking device 300 (see the processing of steps S23 and S33 in FIG. 6). In the locking and unlocking device 300 that has received the locking/unlocking location information, the body ECU 304 performs locking and unlocking of the space specified according to the locking/unlocking location information. The issuance request from the user terminal 200 of the collection/delivery user is a request for issuance of authentication information related to the locking and unlocking of the cargo compartment of the vehicle 10.

In the issue control of FIG. 10, if an affirmative determination is made in step S105, the processing of steps S106 and S107 is performed. If a negative determination is made in step S105, the process proceeds to step S301 and the processing of steps S301 to S304 is performed. The processing after step S301 will be described below. The negative determination made in step S105 means that a preceding parcel is present in the cargo compartment of the vehicle 10 and further that the access to the cargo compartment is not possible due to the setting of the access permission condition. Therefore, in such a case, in step S301, the locking and unlocking control part 4022 does not permit the authentication information management part 4021 to issue authentication information on a "cargo compartment." On the other hand, in step S302, the locking and unlocking control part 4022 permits the authentication information management part 4021 to issue authentication information on a "passenger compartment." The authentication information on a "passenger compartment" corresponds to alternative region authentication information, in the embodiment. As a result, in step S303, the authentication information management part 4021 issues authentication information on a "passenger compartment." In step S304, a notification indicating that the issuance of the authentication information on a "cargo compartment" is not permitted and the delivery location of the collection/delivery parcel is changed to the "passenger compartment" is transmitted to the user terminal 200 that has made the request for issuance of authentication information on a "cargo compartment."

In this way, if the collection/delivery parcel cannot be delivered to the cargo compartment due to the presence of the preceding parcel, the issuance of authentication information is controlled so that the collection/delivery parcel can be delivered to the passenger compartment as an alternative. With such a configuration, it is possible to smoothly deliver the collection/delivery parcel while maintaining the security for the preceding parcel. In the issuance control shown in FIG. 10, no particular issuance condition is set with respect to the issuance of the authentication information on a passenger compartment. However, a condition for controlling the access of the collection/delivery user to the passenger compartment may be set. For example, the information on whether to permit access to the passenger compartment of the vehicle 10 may be set, by the requesting user, in the vehicle management information table stored in the collection/delivery management DB 503. When the issuance control is performed, the center server 400 may access the vehicle management information table to determine whether to issue authentication information on a passenger compartment. Then the processing of step S302 may be performed. In addition, when the delivery location is changed, a notification similar to that of step S304 may also be transmitted to the user terminal 50 of the requesting user.

Fourth Embodiment

A fourth embodiment will be described with reference to FIGS. 11 and 12. FIG. 11 is a block diagram schematically illustrating the configuration of the center server 400. FIG. 12 is a flowchart of control (advance confirmation control) executed by the center server 400 to perform advance confirmation on the issuance of authentication information. In the present embodiment, the advance confirmation control shown in FIG. 12 is executed before the issuance (hereinafter referred to as "official issuance") of authentication information based on the presence or absence of a preceding parcel described in the first embodiment. As a premise of the present embodiment, it is assumed that the center server 400 accesses the collection/delivery information table stored in the collection/delivery management DB 503 of the collection/delivery management server 500 and grasps the time zone (hereinafter referred to as "scheduled delivery time zone") in which the collection/delivery user delivers a parcel to the vehicle 10, but the request for issuance of authentication information is not yet transmitted from the collection/delivery user to the center server 400.

As compared with the configuration shown in FIGS. 2 and 8, the controller 402 of the center server 400 further includes a collection estimation part 4025 and an access frequency adjustment part 4026 as functional parts. The collection estimation part 4025 is a functional part for, when a preceding parcel is present in the cargo compartment of the vehicle 10, estimating whether the preceding parcel is to be collected by the user (requesting user) associated with the preceding parcel until the scheduled access time at which the collection/delivery user delivering a collection/delivery parcel accesses the vehicle 10. By estimating the possibility of collection of the preceding parcel, it is possible to grasp beforehand whether the preceding parcel is to be collected and whether the next user of the vehicle 10 can use the cargo compartment of the vehicle 10. The processing of step S404 in the advance confirmation control corresponds to the estimation processing performed by the collection estimation part 4025.

The advance confirmation control shown in FIG. 12 will now be described. This advance confirmation control is repeatedly executed at predetermined intervals in the center server 400. First, in step S401, the controller 402 determines whether the timing of estimating the possibility of collection of the preceding parcel has arrived. Specifically, the controller 402 determines whether the current time is a predetermined period of time earlier than the scheduled delivery time zone of the collection/delivery parcel grasped by the center server 400 based on the collection/delivery information, for example, thirty minutes earlier than the start time of the scheduled delivery time zone. If an affirmative determination is made in step S401, the process proceeds to step S402. If a negative determination is made, this control comes to an end. In step S402, as in step S102, the first information acquisition part 4023 acquires presence information on the vehicle 10. Then, in step S403, based on the acquired presence information, the controller 402 determines whether a preceding parcel is present in the cargo compartment of the vehicle 10. If an affirmative determination is made in step S403, the process proceeds to step S404. If a negative determination is made, this control is terminated.

In step S404, the collection estimation part 4025 makes estimation as to whether the preceding parcel is to be collected by the requesting user. Specifically, the collection estimation part 4025 determines whether the preceding parcel is to be collected by the requesting user until the time at which the delivery of a collection/delivery parcel is scheduled (i.e., the start time of the scheduled delivery time zone), based on a presence position of the requesting user at the current time. For example, when the center server 400 can access the user terminal 50 of the requesting user, the collection estimation part 4025 may grasp the presence position of the requesting user based on detection data of a GPS device mounted on the user terminal 50. Then, the collection estimation part 4025 may estimate and determine whether the preceding parcel is to be collected, based on the distance between the presence position of the requesting user and the presence position of the vehicle 10 (i.e., the collection/delivery location included in the collection/delivery information related to the collection/delivery parcel) and based on the remaining time from the current time to the scheduled delivery time. At this time, a general walking speed may be taken into account as to a moving speed of the requesting user. If an affirmative determination is made in step S404, this control is terminated. If a negative determination is made, the process proceeds to step S405.

Next, in step S405, the locking and unlocking control part 4022 makes a decision not to permit issuance of authentication information by the authentication information management part 4021. It is to be noted that, at the time when the processing of step S405 is performed, the request for issuance of authentication information is not yet received from the collection/delivery user. Therefore, the processing of step S405 is a processing in which the center server 400 grasping the delivery schedule of a collection/delivery parcel decides, in a state where a request for issuance of authentication information has not been received from the collection/delivery user, not to permit the issuance of authentication information before the arrival of the scheduled delivery time. Then, in step S406, a notification indicating that the issuance of authentication information is not permitted is transmitted to the user terminal 200.

As described above, according to the advance confirmation control shown in FIG. 12, when the collection estimation part 4025 estimates in advance that the collection of the preceding parcel is not anticipated, the collection/delivery user can know, before the arrival of the scheduled delivery time zone, that it is impossible to deliver the collection/delivery parcel. For example, if it is assumed that the collection/delivery user cannot deliver a collection/delivery parcel due to the presence of a preceding parcel after the collection/delivery user arrives at the vehicle 10, a waste in the collection/delivery action of the collection/delivery user is generated and influences the subsequent action significantly. On the other hand, if the collection/delivery user can know in advance through the advance confirmation control that the delivery is impossible, it is possible for the collection/delivery user to cancel the delivery to the vehicle 10 at an early stage and to easily rearrange the subsequent actions. In the present embodiment, the authentication information is not issued to the collection/delivery user when the possibility of collection is estimated. Thus, in step S405, a decision not to permit the issuance of authentication information is made. However, when the authentication information has already been issued to the collection/delivery user at the time of such estimation, in step S405, a process of invalidating the already issued authentication information may be performed as in step S205 described above.

Next, the access frequency adjustment part 4026 will be described. The access frequency adjustment part 4026 is a functional part for, when a user (another user) other than a specific user associated with a vehicle uses a cargo compartment of a vehicle to collect and deliver a parcel, adjusting the frequency of issuing authentication information to the another user so as to adjust the frequency of access to the cargo compartment by the another user. In the present embodiment, the vehicle 10 is associated with the requesting user (see the vehicle management information table shown in FIG. 4). Therefore, the access frequency adjustment part 4026 adjusts a frequency of issuance of authentication information for allowing a user (for example, a collection/delivery user) other than the requesting user to lock and unlock the cargo compartment of the vehicle 10.

Specifically, the access frequency adjustment part 4026 accesses the collection/delivery information table of the collection/delivery management DB 503 of the collection/delivery management server 500, and acquires the end time of the time zone of the collection/delivery date and time stored in the collection/delivery date and time field as the collection time of the preceding parcel by the requesting user. For example, referring to the collection/delivery information table shown in FIG. 3, "twenty o'clock" is acquired as the collection time on the collection/delivery date corresponding to the second line, and "twelve o'clock" is acquired as the collection time on the collection/delivery date corresponding to the third line. The access frequency adjustment part 4026 adjusts the issuance frequency of authentication information of each of the collection/delivery dates based on the acquired collection time. Specifically, as the collection time is later, the issuance frequency is set to be lower. For example, the collection time is as late as twenty o'clock on the collection/delivery date corresponding to the second line. Therefore, the issuance frequency of the authentication information issued after the collection is set to one. In contrast, on the collection/delivery date corresponding to the third line, the collection time is a relatively early time of twelve o'clock. Therefore, the issuance frequency of the authentication information issued after the collection time is set to be relatively high, for example, three. With such a configuration, the frequency with which a user other than the requesting user can access the cargo compartment of the vehicle 10 is adjusted in accordance with the collection time. This makes it possible to avoid a situation where the authentication information is issued at a high frequency and the preceding parcel associated with the requesting user is left in the cargo compartment without being recovered, whereby a user other than the requesting user cannot use the cargo compartment as planned.

In the present embodiment, the center server 400 includes both the collection estimation part 4025 and the access frequency adjustment part 4026. However, the center server 400 may include one of the collection estimation part 4025 and the access frequency adjustment part 4026.

Modification 1 of Embodiments

In the above embodiments, there has been described an example in which the vehicle 10 is unlocked by the locking and unlocking device 300 when the authentication process is successful in the key unit 100. However, in modification 1 of the embodiments, the processing in the key unit 100 may be executed in the locking and unlocking device 300. That is to say, the locking and unlocking device 300 may include a control unit (ECU) for authenticating the authentication information received from the user terminal 200. When the user terminal 200 is successfully authenticated, the control unit may transmit an unlocking command or a locking command to the body ECU 304 via an in-vehicle network such as a CAN or the like.

According to the trunk sharing system 1 of modification 1, it is possible to collect and deliver a parcel in the cargo compartment of the vehicle 10 with a simple configuration without installing the key unit 100.

Modification 2 of Embodiments

In the embodiments described above, when the user terminal 200 receives the authentication information from the center server 400 and the user terminal 200 is authenticated by the key unit 100 based on the received authentication information, the locking/unlocking signal is transmitted from the key unit 100 to the locking and unlocking device 300, whereby the vehicle 10 is locked and unlocked. However, in modification 2 of the embodiments, the authentication information is not information for authenticating the user terminal 200 but includes information of a key ID for locking and unlocking the vehicle 10.

In this case, the user terminal 200 receives authentication information including a key ID for locking and unlocking the vehicle 10 from the center server 400 via the collection/delivery management server 500, and transmits the received key ID to the locking and unlocking device 300 together with a locking/unlocking signal. The locking and unlocking device 300 collates the received key ID with the key ID stored in advance in the locking and unlocking device 300, and locks and unlocks the vehicle 10 when the two key IDs match each other. The key ID is transmitted and received between the user terminal 200 and the center server 400 or between the user terminal 200 and the locking and unlocking device 300 in an encrypted state. For example, the authentication information management part 4021 of the center server 400 may generate a one-time key by encrypting the key ID together with time information using a predetermined algorithm. The locking and unlocking device 300 decrypts the received one-time key using the same predetermined algorithm as that of the center server 400, and collates the one-time key with the key ID stored in advance in the locking and unlocking device 300.

By allowing the authentication information to include the one-term key generated from the key ID and the time information, it is possible for the center server 400 to temporarily generate effective authentication information for each issue request and to transmit the effective authentication information to the user terminal 200.

Modification 3 of Embodiments

In the above modification 2, the center server 400 transmits the authentication information for the user terminal 200 corresponding to fixed authentication information peculiar to the key unit 100, or the key ID stored in advance in the locking and unlocking device 300 of the vehicle 10, to the user terminal 200. However, the authentication information between the user terminal 200 and the key unit 100 is not limited to the above information. In modification 3 of the embodiments, for example, the center server 400 may generate new authentication information and may issue the new authentication information to the user terminal 200 each time an issuance request is received from the user terminal 200. In this case, the center server 400 may transmit the authentication information for the key unit 100 corresponding to the new authentication information for the user terminal 200 to the key unit 100 via the data communication device 350 shown in FIGS. 7 and 8, and may store the authentication information in the key unit 100. In this case, the key unit 100 may be connected to the data communication device 350 via a CAN or the like. Alternatively, the center server 400 may generate new authentication information based on the identification information identifying the vehicle 10 and the time information, and may deliver the new authentication information and the time information to the user terminal 200. In this case, the key unit 100 may also generate new authentication information using the same algorithm as that of the center server 400. Then, the user terminal 200 may transmit the new authentication information and the time information to the key unit 100, and may be authenticated.

Modification 4 of Embodiments

In the embodiments described above, the parcel is mainly composed of the parcel delivered by the collection/delivery user. Alternatively, the preceding parcel may be a parcel that remains in the cargo compartment so as to be collected by the collection/delivery user. In this case, the user who intends to access the remaining parcel is a collection/delivery user who performs the collection and delivery of the remaining parcel, and this collection/delivery user corresponds to the first user. Regarding the second user, in addition to a collection/delivery user who delivers a delivery parcel, a requesting user who tries to collect a parcel different from the parcel remaining in the cargo compartment by using the cargo compartment or a user who intends to use the cargo compartment of the vehicle 10 for purposes other than collection and delivery of a parcel (which may be a user other than the requesting user) may also be the second user.

<Recording Medium>

A program for realizing the aforementioned issuance control in a computer or other machine or apparatus (hereinafter referred to as a computer or the like) may be recorded in a recording medium readable by a computer or the like. By causing a computer or the like to read and execute the program in the recording medium, the computer or the like functions as the center server 400 described above.

As used herein, the term "recording medium readable by a computer or the like" refers to a non-transitory storage medium that can accumulate information such as data and programs by an electrical, magnetic, optical, mechanical, or chemical action and that can be read by a computer or the like. Examples of a recording medium removable from a computer or the like include a flexible disk, a magneto-optical disk, a CD-ROM, a CD-R/W, a DVD, a Blu-ray disk, a DAT, a 8 mm tape, and a memory card such as a flash memory or the like. In addition, examples of a recording medium fixed to a computer or the like include a hard disk, a read only memory (ROM), and the like. Furthermore, a solid state drive (SSD) may be used as a recording medium removable from a computer or the like, or may be used as a recording medium fixed to a computer or the like.

Other Modifications

In the above-described embodiments, the parcel is delivered to a cargo compartment or a passenger compartment that is a predetermined region in a vehicle. However, the parcel may be delivered to a predetermined region in a predetermined facility. Even in this case, the issuance control described above may be performed. The predetermined facility may be of a movable type or may be fixed at a predetermined location.

The control system of the disclosure may be constituted by one or more processing apparatuses such as computers or the like. When the control system is constituted by a plurality of processing apparatuses, respective components of the control system are distributed in the processing apparatuses. The respective processing apparatuses cooperate to realize a process as the control system.

The predetermined region provided in the vehicle or the facility is locked and unlocked by the locking and unlocking process of the locking and unlocking control device, whereby the access of a user to the predetermined region is controlled. An example of the predetermined region may be a trunk (cargo compartment) of a vehicle, a passenger compartment such as a passenger seat or the like, a cargo compartment of a facility, or the like. Locking or unlocking of the predetermined region may be locking or unlocking of a door which controls the access of the user to the predetermined region. A case is considered where the parcel associated with the first user is arranged in the predetermined region and the predetermined region is locked. The term "associated" as used herein means that it is planned to access a parcel locked and arranged in a predetermined region. That is to say, the fact that a parcel associated with a first user is located in a predetermined region means that the first user is scheduled to access the parcel and to collect the parcel. The first user does not necessarily need to be the owner of the vehicle or the facility.

In the control system of the disclosure, the presence information is acquired by the first acquisition part. The presence information is information on whether the parcel associated with the first user is present in the predetermined region. The presence information may be, for example, information indicating the presence or absence of a parcel and may also be information indicating shape, size, or the like if the parcel is present. The presence or absence of the parcel in the predetermined region may be grasped based on detection values of various sensors (cameras, weight sensors, and the like) arranged in the predetermined region, or may be grasped based on input information indicating that the parcel has been arranged by a person concerned with the parcel (a person other than the first user or the first user himself or herself).

When the locking and unlocking control part determines based on the presence information that the parcel associated with the first user is present in the predetermined region and when the predetermined region is locked, the locking and unlocking control part executes a predetermined process of preventing a second user different from the first user from accessing the predetermined region, i.e., a predetermined process of not permitting the unlocking of the predetermined region by a second user. As a result of the predetermined process, As for the invalidation of the second user authentication information, the already issued second user authentication information may be modified, changed, or deleted so that the locking and unlocking process is not executed. Alternatively, an instruction may be issued to the locking and unlocking control device so as not to accept the already issued second user authentication information, i.e., so as not to execute the locking and unlocking process using the second user authentication information.

The access permission condition may be set for each parcel or may be set for all the parcels arranged in the predetermined region. In the case where the access permission condition is set for each parcel, when at least one parcel not satisfying the access permission condition is present in the predetermined region, it is preferable that the unlocking of the predetermined region by the second user is not permitted.

What is claimed is:

1. A locking and unlocking control system, comprising:
a first information acquisition part configured to acquire presence information as to whether a parcel associated with a first user is present in a predetermined region, the predetermined region being defined in a vehicle or a facility, the predetermined region having a door configured to be locked and unlocked through a locking and unlocking process, and the locking and unlocking process being performed by a locking and unlocking control device;
a locking and unlocking control part configured to execute a predetermined process so as not to permit unlocking of the door by a second user different from the first user when an access prohibition condition including both of following conditions are satisfied: the locking and unlocking control part determines, based on the presence information, that the parcel is present in the predetermined region, and the door is locked; and
a collection estimation part configured to estimate whether or not the parcel is to be collected by the first user when the locking and unlocking control part determines that the parcel is present in the predetermined region until a predetermined time that the second user accesses the predetermined region,
wherein the locking and unlocking control part is configured to execute the predetermined process when the collection estimation part estimates that the parcel is not to be collected by the first user.

2. The locking and unlocking control system according to claim 1, wherein the system is configured to control, by issuing predetermined authentication information for causing the locking and unlocking control device to execute the locking and unlocking process, to a user terminal of each of the users at least including the second user, access of users including at least the second user to the predetermined region.

3. The locking and unlocking control system according to claim 2, wherein when the locking and unlocking control part receives a permission request signal requesting permission to lock and unlock the door from the user terminal of the second user, the locking and unlocking control part is configured to execute, as the predetermined process, a process of not performing issuance of the authentication information for the second user when the access prohibition condition is satisfied.

4. The locking and unlocking control system according to claim 2, wherein the locking and unlocking control part is configured to execute, as the predetermined process, a process of invalidating the authentication information for the second user already issued to the user terminal of the second user.

5. The locking and unlocking control system according to claim 2, further comprising a second information acquisition part configured to acquire information on an access permission condition for permitting access to the predetermined region by the second user even when the parcel is present in the predetermined region,
wherein the locking and unlocking control part is configured:
to permit the second user to unlock the door by not executing the predetermined process when the parcel satisfies the access permission condition, even when the access prohibition condition is satisfied; and
not to permit the second user to unlock the door by executing the predetermined process when the parcel does not satisfy the access permission condition, when the access prohibition condition is satisfied.

6. The locking and unlocking control system according to claim 5, wherein the second information acquisition part is configured to acquire the access permission condition set by the first user.

7. The locking and unlocking control system according to claim 2, wherein:

the vehicle or the facility includes an alternative region independent from the predetermined region, the alternative region having a second door controlled to be locked and unlocked via the user terminal of the second user and the locking and unlocking control device so as to allow the second user to access the alternative region; and when the access prohibition condition is satisfied, the locking and unlocking control part is configured to permit unlocking of the second door by the second user by issuing alternative region authentication information for allowing the second user to unlock the second door.

8. The locking and unlocking control system according to claim 7, wherein when the locking and unlocking control part executes the predetermined process, the locking and unlocking control part is configured to issue the alternative region authentication information after not permitting the second user to unlock the predetermined region.

9. The locking and unlocking control system according to claim 2, wherein the locking and unlocking control part is configured to
notify the second user that the unlocking of the door of the predetermined region is not permitted.

10. The locking and unlocking control system according to claim 2, further comprising an access frequency adjustment part configured to
acquire information on a collection time at which the parcel arranged in the predetermined region is to be collected by the first user, and
adjust, based on the collection time, an issuance frequency of the authentication information for users other than the first user, including the second user, for allowing the users other than the first user to access the predetermined region.

11. A locking and unlocking control method, comprising:
acquiring presence information with an information acquisition part as to whether a parcel associated with a first user is present in a predetermined region, the predetermined region being defined in a vehicle or a facility, and the predetermined region having a door configured to be locked and unlocked through a locking and unlocking process performed by a locking and unlocking control device;
executing a predetermined process with a locking and unlocking control part so as not to permit unlocking of the door by a second user different from the first user when it is determined, based on the presence information, that the parcel is present in the predetermined region and when the door is locked;
estimating with a collection estimation part whether or not the parcel is to be collected by the first user when the locking and unlocking control part determines that the parcel is present in the predetermined region until a predetermined time that the second user accesses the predetermined region; and
executing with the locking and unlocking control part the predetermined process when the collection estimation part estimates that the parcel is not to be collected by the first user.

12. The locking and unlocking control method according to claim 11, wherein access to the predetermined region by users including at least the second user is controlled by issuing, to a user terminal of each of the users including at least the second user, predetermined authentication information for allowing the locking and unlocking control device to execute the locking and unlocking process.

13. The locking and unlocking control method according to claim 12, wherein the executing the predetermined process with the locking and unlocking control part includes, upon receiving a permission request signal requesting permission to lock and unlock the door from the user terminal of the second user, executing with the locking and unlocking control part, as the predetermined process, a process of not issuing authentication information for the second user, when it is determined that the parcel is present in the predetermined region and when the door is locked.

14. The locking and unlocking control method according to claim 12, wherein the executing the predetermined process with the locking and unlocking control part includes executing, as the predetermined process, a process of invalidating the authentication information for the second user already issued to the user terminal of the second user.

15. A locking and unlocking control system, comprising:
a first information acquisition part configured to acquire presence information as to whether a parcel associated with a first user is present in a predetermined region, the predetermined region being defined in a vehicle or a facility, the predetermined region having a door configured to be locked and unlocked through a locking and unlocking process, and the locking and unlocking process being performed by a locking and unlocking control device;
a locking and unlocking control part configured to execute a predetermined process so as not to permit unlocking of the door by a second user different from the first user when an access prohibition condition including both of following conditions are satisfied: the locking and unlocking control part determines, based on the presence information, that the parcel is present in the predetermined region, and the door is locked; and
a collection estimation part configured to estimate, based on a presence position of the first user, whether the parcel is to be collected by the first user at a timing that is a predetermined period of time earlier than a predetermined time, when the access by the second user to the predetermined region is scheduled at the predetermined time and when the locking and unlocking control part determines, based on the presence information, that the parcel is present in the predetermined region,
wherein the system is configured to control, by issuing predetermined authentication information for causing the locking and unlocking control device to execute the locking and unlocking process, to a user terminal of each of the users at least including the second user, access of users including at least the second user to the predetermined region,
wherein the locking and unlocking control part is configured to
execute, when the collection estimation part estimates that the parcel is not to be collected, the predetermined process before the predetermined time so as not to permit the second user to unlock the door of the predetermined region, and
notify the second user that the unlocking of the door of the predetermined region is not permitted.

16. The locking and unlocking control system according to claim 15, wherein when the locking and unlocking control part receives a permission request signal requesting permission to lock and unlock the door from the user terminal of the second user, the locking and unlocking control part is configured to execute, as the predetermined process, a process of not performing issuance of the authentication information for the second user when the access prohibition condition is satisfied.

17. The locking and unlocking control system according to claim 15, wherein the locking and unlocking control part is configured to execute, as the predetermined process, a process of invalidating the authentication information for the second user already issued to the user terminal of the second user.

18. The locking and unlocking control system according to claim 15, further comprising a second information acquisition part configured to acquire information on an access permission condition for permitting access to the predetermined region by the second user even when the parcel is present in the predetermined region,
wherein the locking and unlocking control part is configured:
to permit the second user to unlock the door by not executing the predetermined process when the parcel satisfies the access permission condition, even when the access prohibition condition is satisfied; and
not to permit the second user to unlock the door by executing the predetermined process when the parcel does not satisfy the access permission condition, when the access prohibition condition is satisfied.

19. The locking and unlocking control system according to claim 18, wherein the second information acquisition part is configured to acquire the access permission condition set by the first user.

20. The locking and unlocking control system according to claim 15, wherein:
the vehicle or the facility includes an alternative region independent from the predetermined region, the alternative region having a second door controlled to be locked and unlocked via the user terminal of the second user and the locking and unlocking control device so as to allow the second user to access the alternative region; and
when the access prohibition condition is satisfied, the locking and unlocking control part is configured to permit unlocking of the second door by the second user by issuing alternative region authentication information for allowing the second user to unlock the second door.

* * * * *